US010268766B2

(12) United States Patent
Lev et al.

(10) Patent No.: US 10,268,766 B2
(45) Date of Patent: Apr. 23, 2019

(54) SYSTEMS AND METHODS FOR COMPUTATION OF A SEMANTIC REPRESENTATION

(71) Applicant: Twiggle Ltd., Tel-Aviv (IL)

(72) Inventors: Iddo Lev, Tel-Aviv (IL); Arbel Deutsch Peled, Tel-Aviv (IL); Noa Ganot, Givataim (IL); Tal Koren, Modi'in-Maccabim-Re'ut (IL); Avishay Lavie, Tel-Aviv (IL); Eli Shalom, Tel-Aviv (IL); Adi Avidor, Tel-Aviv (IL)

(73) Assignee: Twiggle Ltd., Tel-Aviv (IL)

( * ) Notice: Subject to any disclaimer, the term of this patent is extended or adjusted under 35 U.S.C. 154(b) by 0 days.

(21) Appl. No.: 15/879,521

(22) Filed: Jan. 25, 2018

(65) Prior Publication Data

US 2018/0150557 A1   May 31, 2018

Related U.S. Application Data

(63) Continuation-in-part of application No. 15/416,337, filed on Jan. 26, 2017, which is a continuation-in-part
(Continued)

(51) Int. Cl.
   *G06F 17/30*  (2006.01)
   *G06N 5/02*  (2006.01)

(52) U.S. Cl.
   CPC .. *G06F 17/30864* (2013.01); *G06F 17/30607* (2013.01); *G06F 17/30684* (2013.01); *G06N 5/022* (2013.01)

(58) Field of Classification Search
   CPC ......... G06F 17/30864; G06F 17/30684; G06F 17/30607
   See application file for complete search history.

(56) References Cited

U.S. PATENT DOCUMENTS 7,627,671 B1 * 12/2009 Palma ................. G06F 11/3616
                                                              709/223
7,644,052 B1    1/2010 Chang et al.
(Continued)

OTHER PUBLICATIONS

Applicant-Initiated Interview Summary dated Dec. 29, 2017 From the US Patent and Trademark Office Re. U.S. Appl. No. 15/275,620. (3 pages).
(Continued)

*Primary Examiner* — Tarek Chbouki

(57) ABSTRACT

There is provided a method for converting input data into a semantic representation, comprising: receiving input data, parsing the input data to identify terms, converting the terms into candidate semantic elements that map to model element(s) of a hierarchical object model, designating one of the candidate semantic elements as a basis semantic element indicative of an object type, wherein the basis semantic representation is set as a root of a tree data structure representation of the semantic representation, combining a subset of the candidate semantic elements into the semantic representation according to a path requirement between each of the model elements and the object type, wherein the semantic representation comprises a hierarchical structure of the subset of the candidate semantic elements connected to the basis semantic element by semantic relations, and creating a structured representation of the input data based on the semantic representation for execution by the search engine.

32 Claims, 11 Drawing Sheets

Related U.S. Application Data of application No. 15/275,620, filed on Sep. 26, 2016, now Pat. No. 10,067,965.

(56) References Cited

U.S. PATENT DOCUMENTS

| | | | |
|---|---|---|---|
| 7,917,484 B1 | 3/2011 | Vermeulen et al. | |
| 7,949,691 B1 | 5/2011 | Franciscus de Heer et al. | |
| 8,260,771 B1 | 9/2012 | Ortega et al. | |
| 8,781,916 B1 | 7/2014 | Buryak | |
| 9,069,566 B1 | 6/2015 | Kumar et al. | |
| 9,069,825 B1 | 6/2015 | Chang | |
| 2001/0044758 A1 | 11/2001 | Talib et al. | |
| 2002/0087416 A1 | 7/2002 | Knutson | |
| 2003/0193994 A1* | 10/2003 | Stickler | G06F 17/30017 375/150 |
| 2003/0212699 A1 | 11/2003 | Denesuk et al. | |
| 2003/0217052 A1 | 11/2003 | Rubenczyk et al. | |
| 2004/0024739 A1 | 2/2004 | Copperman et al. | |
| 2004/0117402 A1 | 6/2004 | Tateson et al. | |
| 2005/0154708 A1* | 7/2005 | Sun | G06F 17/30575 |
| 2005/0160056 A1 | 7/2005 | Hugh et al. | |
| 2005/0192926 A1* | 9/2005 | Liu | G06N 5/02 |
| 2005/0222987 A1 | 10/2005 | Vadon | |
| 2006/0026203 A1 | 2/2006 | Tan et al. | |
| 2007/0027864 A1 | 2/2007 | Collins et al. | |
| 2007/0203929 A1 | 8/2007 | Bolivar | |
| 2007/0219857 A1 | 9/2007 | Seymour et al. | |
| 2008/0109327 A1 | 5/2008 | Mayle et al. | |
| 2009/0192784 A1 | 7/2009 | Cole et al. | |
| 2009/0248608 A1* | 10/2009 | Ravikumar | G06F 17/30905 706/55 |
| 2010/0049731 A1 | 2/2010 | Kiran Vedula | |
| 2010/0306198 A1 | 12/2010 | Gadacz | |
| 2011/0103682 A1* | 5/2011 | Chidlovskii | G06K 9/6284 382/159 |
| 2011/0320191 A1* | 12/2011 | Makeyev | G06F 17/2785 704/9 |
| 2012/0158958 A1* | 6/2012 | Jeffords | G06F 8/24 709/224 |
| 2012/0259882 A1 | 10/2012 | Thakur et al. | |
| 2013/0066740 A1 | 3/2013 | Ouimet et al. | |
| 2013/0132365 A1 | 5/2013 | Chang et al. | |
| 2013/0246328 A1* | 9/2013 | Sweeney | G06N 7/005 706/50 |
| 2013/0254193 A1* | 9/2013 | Heidasch | G06F 17/30958 707/736 |
| 2013/0332460 A1 | 12/2013 | Pappas et al. | |
| 2013/0339340 A1 | 12/2013 | Pfitzner | |
| 2014/0372956 A1 | 12/2014 | Bisca et al. | |
| 2015/0019204 A1* | 1/2015 | Simard | G06F 17/2785 704/9 |
| 2015/0051979 A1 | 2/2015 | Knab et al. | |
| 2015/0286886 A1* | 10/2015 | Wimmer | G06K 9/00865 382/173 |
| 2015/0348148 A1 | 12/2015 | Sharma et al. | |
| 2016/0019294 A1 | 1/2016 | Dong et al. | |
| 2016/0078038 A1 | 3/2016 | Solanki et al. | |
| 2017/0060868 A1 | 3/2017 | Rais Ghasem et al. | |
| 2017/0140405 A1 | 5/2017 | Gottemukkala et al. | |
| 2017/0148082 A1 | 5/2017 | Murahari et al. | |
| 2017/0185674 A1* | 6/2017 | Tonkin | G06F 17/30734 |
| 2017/0206416 A1 | 7/2017 | Chen et al. | |
| 2017/0316066 A1 | 11/2017 | Mohan | |
| 2017/0323636 A1* | 11/2017 | Xiao | G10L 15/16 |
| 2018/0089212 A1 | 3/2018 | Deutsch Peled et al. | |
| 2018/0089242 A1 | 3/2018 | Lev et al. | |
| 2018/0089316 A1 | 3/2018 | Ganot et al. | |
| 2018/0196822 A1 | 7/2018 | Lewin-Eytan et al. | |

OTHER PUBLICATIONS

Examiner-Initiated Interview Summary dated Jun. 12, 2017 From the US Patent and Trademark Office Re. U.S. Appl. No. 15/275,620. (2 Pages).

Official Action dated Nov. 9, 2016 From the US Patent and Trademark Office Re. U.S. Appl. No. 15/275,620. (13 pages).

Official Action dated Nov. 9, 2017 From the US Patent and Trademark Office Re. U.S. Appl. No. 15/275,620. (20 pages).

Official Action dated Apr. 27, 2017 From the US Patent and Trademark Office Re. U.S. Application No. 15/275,620. (16 pages).

Official Action dated Sep. 29, 2017 From the US Patent and Trademark Office Re. U.S. Appl. No. 15/681,514. (13 pages).

Advisory Action Before the Filing of an Appeal Brief dated Aug. 1, 2018 From the US Patent and Trademark Office Re. U.S. Appl. No. 15/681,514. (8 pages).

Official Action dated Apr. 6, 2018 From the US Patent and Trademark Office Re. U.S. Appl. No. 15/416,337. (28 pages).

Official Action dated Apr. 10, 2018 From the US Patent and Trademark Office Re. U.S. Appl. No. 15/681,514. (20 pages).

Applicant-Initiated Interview Summary dated Jun. 8, 2018 From the US Patent and Trademark Office Re. U.S. Appl. No. 15/416,337. (3 pages).

Official Action dated Sep. 19, 2018 From the US Patent and Trademark Office Re. U.S. Appl. No. 15/416,337. (11 Pages).

\* cited by examiner

SYSTEMS AND METHODS FOR COMPUTATION OF A SEMANTIC REPRESENTATION

RELATED APPLICATIONS

This application is a Continuation-in-Part (CIP) of U.S. patent application Ser. No. 15/416,337 filed on Jan. 26, 2017, which is also a Continuation-in-Part (CIP) of U.S. Utility patent application Ser. No. 15/275,620 filed on Sep. 26, 2016. The contents of the above applications are all incorporated by reference as if fully set forth herein in their entirety.

FIELD AND BACKGROUND OF THE INVENTION

The present invention, in some embodiments thereof, relates to web searches and, more specifically, but not exclusively, to product-related searches in e-commerce websites.

Known e-commerce product search services utilize keyword search engines. Such engines don't take into account relations between e-commerce concepts and frequently return unsuitable results, making the search for a desired product or for a list of suitable products very cumbersome and inconvenient for a user, which is forced to perform many search iterations and/or eventually may fail to find what he looks for.

SUMMARY OF THE INVENTION

According to a first aspect, a method for converting input data into a semantic representation for creation of structured data for execution by a search engine, comprising: receiving input data via a software interface, parsing the input data to identify a plurality of terms, converting the plurality of terms into a corresponding plurality of candidate semantic elements, wherein each candidate semantic element maps to at least one model element of a hierarchical object model, designating one of the plurality of candidate semantic elements as a basis semantic element indicative of an object type, wherein the basis semantic representation is set as a root of a tree data structure representation of the semantic representation, combining a subset of the plurality of candidate semantic elements into the semantic representation according to a path requirement between each of the model elements of the hierarchical object model corresponding to each of the subset of the plurality of candidate semantic elements and the object type of the hierarchical object model corresponding to the basis semantic element, wherein the semantic representation comprises a hierarchical structure of the subset of the plurality of candidate semantic elements connected to the basis semantic element by semantic relations, creating a structured representation of the input data based on the semantic representation, and providing the structured representation, via the software interface, for execution by the search engine.

According to a second aspect, a system for converting input data into a semantic representation for creation of structured data for execution by a search engine, comprising: a non-transitory memory having stored thereon a code for execution by at least one hardware processor of a computing device, the code comprising: code for receiving input data via a software interface, code for parsing the input data to identify a plurality of terms, code for converting the plurality of terms into a corresponding plurality of candidate semantic elements, wherein each candidate semantic element maps to at least one model element of a hierarchical object model, code for designating one of the plurality of candidate semantic elements as a basis semantic element indicative of an object type, wherein the basis semantic representation is set as a root of a tree data structure representation of the semantic representation, code for combining a subset of the plurality of candidate semantic elements into the semantic representation according to a path requirement between each of the model elements of the hierarchical object model corresponding to each of the subset of the plurality of candidate semantic elements and the object type of the hierarchical object model corresponding to the basis semantic element, wherein the semantic representation comprises a hierarchical structure of the subset of the plurality of candidate semantic elements connected to the basis semantic element by semantic relations, code for creating a structured representation of the input data based on the semantic representation, and code for providing the structured representation, via the software interface, for execution by the search engine.

According to a third aspect, a computer program product for converting input data into a semantic representation for creation of structured data for execution by a search engine, comprising: a non-transitory memory having stored thereon a code for execution by at least one hardware processor of a computing device, the code comprising: instructions for receiving input data via a software interface, instructions for parsing the input data to identify a plurality of terms, instructions for converting the plurality of terms into a corresponding plurality of candidate semantic elements, wherein each candidate semantic element maps to at least one model element of a hierarchical object model, instructions for designating one of the plurality of candidate semantic elements as a basis semantic element indicative of an object type, wherein the basis semantic representation is set as a root of a tree data structure representation of the semantic representation, instructions for combining a subset of the plurality of candidate semantic elements into the semantic representation according to a path requirement between each of the model elements of the hierarchical object model corresponding to each of the subset of the plurality of candidate semantic elements and the object type of the hierarchical object model corresponding to the basis semantic element, wherein the semantic representation comprises a hierarchical structure of the subset of the plurality of candidate semantic elements connected to the basis semantic element by semantic relations, instructions for creating a structured representation of the input data based on the semantic representation, and instructions for providing the structured representation, via the software interface, for execution by the search engine.

Some implementations of the systems, methods, apparatus, and/or code instructions (stored in a data storage device and executable by one or more hardware processors) described herein address the technical problem of improving the computational efficiency of a computing device that computes the semantic representation for unstructured object-data, for example, a text query, and/or a text record of the object.

The improvement in computational efficiency of the computing device may include, for example, a reduction in time to perform the computation using available computational hardware, an improvement in utilization of available computational hardware (e.g., processor(s)) to perform the computation, and/or an improvement in utilization of available data storage devices (e.g., memory) to perform the computation. The improvement in utilization of available computational hardware and/or available data storage devices improve performance by utilizing available resources rather than requiring an increase in the available resources.

The technical problem may be related to improving the efficiency of searching in a space of possible (optionally all possible) semantic representations based on the semantic elements identified in the object-related data (e.g., text). The goal is to find the representation with the lowest possible cost that covers as much of the input semantic material as possible. A naïve search within the space incurs high computational costs based on an examination of a large number of combinations, for example, in terms of a long processing time, and/or in terms of high processor utilization and/or high memory utilization.

The technical problem may be related to improving the efficiency of computing the semantic representation for an object listing (e.g., product listing). A method that only considers searching for keywords in titles of the object listing to identify the object type (e.g., product type) are ineffective and/or computational inefficient, for example, expressions that are ambiguous are confusing (e.g., an expression that in general may refer to the object type, but does not refer to the object type in the specific context such as within a title). In another example, expressions that may serve as the main object (e.g., product) type but in the specific context of a title serve as a component of the main product type and not as the main product type itself. In yet another example, no explicit product type is mentioned in the title, and hence inference of the implicit product type is required. When a full semantic analysis of additional data of the object listing is performed (e.g., the product specification) based on a naïve method that considers a large number of combinations, the accuracy of computing the semantic representation may be increased but at a cost of computational inefficiency, as described herein.

Some implementations of the systems, methods, apparatus, and/or code instructions described herein improve computational efficiency of a computing device in accurately identifying the main object type (e.g., main product type) from the object-related data (e.g., product listing). The improvement in computational efficiency arises, for example, in the analysis of a product (e.g., object) title by the systems, methods, apparatus, and/or code instructions described herein, which quickly zone in on the basis semantic element having the greatest potential. The basis semantic element may yield the title's main product type, even without performing a full semantic analysis of the entire title.

Computational efficiency of the computing device may be improved based on the efficiency and/or fast access to the hierarchical object model to compute the path cost. The path costs may be computed offline a single time and/or stored in memory that is accessed at run-time during analysis of the text input data. The fast and/or efficient access of the hierarchical object model to obtain the path costs provides improved computational efficiency for example, in terms of reduced processing time.

Computational efficiency of the computing device may be obtained based on the combination of the candidate semantic elements performed with no decision points, or with fewer decision points that would otherwise occur in the naïve implementation described herein, which reduces total computational processing resource utilization and/or processing time.

The technical problem of improving the efficiency of computing the semantic representation is based on multiple factors, for example: (i) Ambiguities of language expression, where a certain expression has multiple possible meanings, all of which may be considered in a naïve search, which generates a large number of combinations. (ii) Implicit reference, where the main object type (e.g., type of product) does not explicitly appear in the object-related data (e.g., object type is not listed in the search query), and therefore leads to generating a large number of possible candidates for the main object type which are inferred from other terms of the object-related data. (iii) Irrelevant terms in the object-related data (e.g., irrelevant and/or contradictory text in the search query), which are skipped during the search, generating an even larger number of combinations when considering the possible sub-sets (e.g., permutations) of terms that may need to be skipped in order to find a consistent and coherent semantic representation.

Inventors tested some implementations of the systems, methods, apparatus, and/or code instructions described herein, and discovered that for an ambiguous search query, the object (i.e., product) type was correctly narrowed down to one option, in about 80-90% of the queries, depending on the source of the queries. Analysis showed that the latency for the search queries is improved by about 50%. The latency for detection of object (i.e., product) type when the input data includes an object (i.e., product) listing is reduced by about 75%, while obtaining an accuracy of about 95% for detection of the main product type.

The factors affecting efficient computation of semantic representations are now discussed in additional detail.

(i) Ambiguous terms—Natural language texts include terms that are ambiguous, having multiple possible meanings. A certain term extracted from the object-related data potentially maps to multiple model elements.

In such object-related data (e.g., text search query, text product listing), the proliferation of possible model elements incurs a significant increase in processing time due to a rapidly increasing number of combinations that are processed. The combinations arise since the potential interaction of each model element with all other model elements must be evaluated in a naïve implementation to make sure that the different model elements are linked in an optimal semantic inter-relationship(s), rather than being joined together in an illogical or irrelevant manner. It is noted that most of the processing is wasted effort, as most of the checks of the combinations discover that there is no valid semantic relation between the model elements.

For example, for the search query "red keyboard qwerty", the term "keyboard" is ambiguous since the term "keyboard" may refer to a computer Keyboard or a musical instrument Keyboard. The interaction between all the multiple elements requires investigation to determine the actual intent of the user. In a naive implementation, both types of "keyboard" may connect to the attribute "red", yielding two larger elements covering "red keyboard", although only one of the elements may actually be connected to "qwerty". The computational processing that was performed to construct an element connecting the music Keyboard with "red", and then the attempt to connect the combined element with "qwerty" is wasted effort.

When there are several additional elements in the query, most of which are able to connect to either type of Keyboard, and only the last element that is checked helps to disqualify the incorrect meaning, the total processing resources executed as a wasted effort may add up to a significant amount. The amount of wasted processing effort is further increased when the other two factors mentioned in the previous paragraphs leading to processing inefficiency are encountered as well.

(ii) Implicit inference—Implicit referencing is performed for an object-related data (e.g., search query) in which the object type (e.g., product type) is not explicitly stated in the query, for example, "long sleeves", "galaxy s" and "red". Since the product type is not explicitly stated, inference of the product type is carried out. The different possible paths in the hierarchical object model (i.e., semantic ontology) that lead from the model elements corresponding to terms of the query to potential main product types are explored. Based on the example queries above, since "sleeves" means Sleeve which is a component of a Dress, the main product type Dress is inferred. Since "galaxy" and "s" are a series and model terms of a Smartphone, the product type Smartphone is inferred for the query. Similar inferences may be based on colors, materials, brands, collections, and more.

When all possible inferences are considered then processing efficiency is significantly reduced (e.g., processing time increases significantly). In most cases, a large number the explored implicit inferences are later discarded when they lead to dead ends, for example, the inferred object type is incorrect in view of other terms in the query.

For example, for the query "red long sleeved maxi dress", a naive implementation infers product types from each of the terms "red", "long sleeved" and "maxi" (it is noted that each of these terms is a legitimate query by itself). Each one of the inferred product types may connect to all of the other terms, and so the final semantic representation may be redundantly obtained in several different ways, which reduces computational efficiency (e.g., increasing processing cost). Moreover, in this example case, the product type is explicitly stated ("dress"), and so the implicit product type inference is superfluous.

(iii) Irrelevant terms (i.e., dead material)—the object-related data (i.e., input text) may include one or more terms that cannot be used in a final interpretation of the object-related data. Some exemplary reasons include: (A) The term is a garbage token, for example, a spelling mistake that was not caught by the spelling corrector. (B) The term has a corresponding entry known in the hierarchical object model (e.g., lexicon), but none of the possible known meanings connect to the rest of the semantic material in the input text. (C) The term contradicts some other part of the input text. For example, for the text "dell laptop hp", two different (and incompatible) brands are mentioned ("dell" and "hp"). An interpretation can utilize only one of the brands and must ignore the other. In an implementation that skips (i.e., ignores) a problematic term, it is not known in advance (before processing starts) which term(s) are the problematic terms that should be skipped so that the remaining elements can be combined to form a consistent and coherent semantic representation.

As such, permutations in which one or more terms should be skipped are created, resulting in a significant number of sets of terms to analyze to determine the permutation that yields the best coverage of the input text with the fewest number of skips. However, such processing reduces computational efficiency (e.g., incurs an expensive cost in processing time), since allowing skips adds a large number of additional options that are investigated. For example, allowing to skip over one term multiplies the number of processing steps by a factor of N=the number of terms. Skipping over two terms multiplies by a factor of N^2, and so on until the number of terms skipped over is one less than the total number of terms extracted from the input text.

Some implementations of the systems, methods, apparatus, and/or code instructions described herein address the technical problem by computing the semantic representation according to the lowest possible cost between as many of the semantic elements identified within the received object-related.

Some implementations of the systems, methods, apparatus, and/or code instructions described herein improve the computational efficiency of a computing device computing the semantic representation for an object listing (e.g., product listing), in particular for fields of the object listing that store long values (e.g., bullets, description fields storing free style text). The computational improvements include, for example, reduced processing time, and/or reduced utilization of processing resources and/or reduced utilization of data storage resources. The computational improvement may result from selection of the basis semantic element and path connected candidate semantic elements as described herein, which filters out meanings that do not have an ontological connection to the context (e.g., main product type and possible ontological paths). The remaining relatively small number of relevant semantic elements may be efficiently combined into the semantic representation.

In a further implementation form of the first, second, and third aspects, the path requirement denotes a lowest path cost between each of the model elements of the hierarchical object model and the object type of the hierarchical object model corresponding to the basis semantic element.

In a further implementation form of the first, second, and third aspects, when a certain term of the plurality of terms corresponds to a plurality of candidate semantic elements, the subset of the plurality of candidate semantic elements are combined into the semantic representation according to a lowest cost path within the hierarchical object model of a plurality of model elements corresponding to the plurality of candidate semantic elements, wherein the lowest cost path is indicative of one of the plurality of terms that correspond to the certain term.

In a further implementation form of the first, second, and third aspects, a data structure stores sub-combinations of the plurality of candidate semantic elements, each respective sub-combination associated with a cost of a path between candidate semantic elements of the sub-combination, wherein sub-combinations are selected from the data structure for combination into the semantic representation according to a lowest ranking of the cost of the path.

In a further implementation form of the first, second, and third aspects, the input data comprises a search query, and the structured representation of the semantic representation of the search query comprises an interpreted search query for execution by the search engine by matching the interpreted search query with at least one modeled object representations stored in an enhanced indexed object dataset.

In a further implementation form of the first, second, and third aspects, the input data comprises product-related data of a certain product, and the semantic representation is integrated within an existing object dataset searchable by the search engine.

In a further implementation form of the first, second, and third aspects, the converting between each term and corresponding candidate semantic element is associated with a certain weight indicative of the ambiguity that the term actually refers to the corresponding candidate semantic element.

In a further implementation form of the first, second, and third aspects, each respective candidate semantic element is associated with a span-index indicative of at least one term of the input data corresponding to the respective semantic element.

In a further implementation form of the first, second, and third aspects, a same span-index value of an ambiguous term maps to a plurality of candidate semantic elements.

In a further implementation form of the first, second, and third aspects, a plurality of terms of the input data are converted into a single candidate semantic element according to a set of parser rules.

In a further implementation form of the first, second, and third aspects, subsets of the plurality of candidate semantic element are stored in a chart data structure, wherein each cell of the chart data structure stores increasingly larger combinations of candidate semantic elements, wherein initially each of the plurality of candidate semantic elements are stored in cells of the chart data structure corresponding to a span-index of the terms from which the respective candidate semantic elements were converted, and larger combinations of the plurality of candidate semantic elements are constructed from smaller plurality of candidate semantic elements according to combination rules and stored in cells of the chart data structure corresponding to the location of the plurality of terms that correspond to the larger combinations of the plurality of candidate semantic elements.

In a further implementation form of the first, second, and third aspects, the chart data structure is initialized according to a first candidate basis semantic element and at least one candidate semantic element of the plurality of candidate semantic elements connected to the first candidate basis semantic element according to paths of the hierarchical object model connecting the model element corresponding to the first candidate basis semantic element and the at least one model element corresponding to the at least one candidate semantic element of the plurality of candidate semantic elements connected to the first candidate basis semantic element.

In a further implementation form of the first, second, and third aspects, the first candidate basis semantic element is selected from the plurality of candidate semantic elements according to an estimated total lowest path cost between the model elements corresponding to the plurality of candidate semantic elements and the object type of the first candidate basis semantic element, and according to an estimated largest number of the plurality of terms corresponding to model elements having paths within the hierarchical object model connecting to the model element corresponding to the one of the plurality of candidate semantic elements, wherein the first candidate basis semantic element is set according to the one of the plurality of candidate semantic elements.

In a further implementation form of the first, second, and third aspects, the method further comprises and/or the system further comprises code instructions for and/or the computer program product further comprises additional instructions for computing according to the chart data structure initialized with the first candidate basis semantic element and the at least one candidate semantic element of the plurality of candidate semantic elements connected to the first candidate basis semantic element, a total path cost and a corresponding total number of the plurality of terms, and initializing the chart data structure with a second candidate basis semantic element when the total path cost and the corresponding total number of the plurality of terms computed for the first candidate basis semantic element is higher than the estimated lowest path cost and/or lower than the estimated largest number of the plurality of terms, wherein the second candidate semantic element is selected according to a next ranking of an estimated lowest path cost and an estimated largest number of the plurality of terms computed for the second candidate semantic element.

In a further implementation form of the first, second, and third aspects, the method further comprises and/or the system further comprises code instructions for and/or the computer program product further comprises additional instructions for designating the basis semantic element from the plurality of candidate semantic elements according to a lowest path cost between the model element corresponding to one of the plurality of candidate semantic elements and the object type of the hierarchical object model, wherein the basis semantic element is set according to the one of the plurality of candidate semantic elements.

In a further implementation form of the first, second, and third aspects, the method further comprises and/or the system further comprises code instructions for and/or the computer program product further comprises additional instructions for designating at least one term of the plurality of terms as dead material when no path exists within the hierarchical data structure between at least one model element corresponding to the at least one term and the basis semantic element, wherein the at least one candidate semantic element corresponding to the at least one model element corresponding to the at least one term designated as dead material is excluded from combination to create the semantic representation.

In a further implementation form of the first, second, and third aspects, the combining is performed according to a first semantic combination rule that creates a candidate semantic representation by combining the basis semantic element with another candidate semantic element when a path exists within the hierarchical object model, between the model element corresponding to the another candidate semantic element and the object type of the hierarchical object model corresponding to the basis semantic element.

In a further implementation form of the first, second, and third aspects, the combining the subset of the plurality of candidate semantic elements is performed iteratively, by combining shorter candidate semantic representations into longer semantic representations according to a lowest cost associated with the respective paths between model elements of the hierarchical object model corresponding to the shorter candidate semantic representation.

In a further implementation form of the first, second, and third aspects, a first longer candidate semantic element having a path cost that is higher than a second longer candidate semantic element is further iteratively combined with another candidate semantic element when no path exists between the second longer candidate semantic element and the another candidate semantic element.

In a further implementation form of the first, second, and third aspects, the combining is performed according to a second semantic combination rule that creates a link between a first candidate semantic element indicative of an attribute and a second candidate semantic element storing a value defined as appropriate for the attribute of the first candidate semantic element, wherein at least one term of the input data corresponding to the second semantic element is located within the input data adjacent to at least one term corresponding to the first semantic element.

In a further implementation form of the first, second, and third aspects, the subset of the plurality of candidate semantic elements combined into the semantic representation correspond to distinct terms of the input data, such that no two candidate semantic elements of the subset of the plurality of candidate semantic elements correspond to the same term of the plurality of terms.

In a further implementation form of the first, second, and third aspects, shorter candidate semantic elements are iteratively combined to create longer candidate semantic element by ignoring candidate semantic elements mapped to permutations of at least one term of the plurality of terms.

In a further implementation form of the first, second, and third aspects, the basis semantic element stores an object type of the semantic representation.

In a further implementation form of the first, second, and third aspects, a certain candidate semantic element of the plurality of candidate semantic representations is designated as the basis semantic element when a path exists within the hierarchical object model between the certain candidate semantic element and the object type of the hierarchical object model.

In a further implementation form of the first, second, and third aspects, the certain candidate semantic element is selected over another candidate semantic element when the cost of the path within the hierarchical object model between the certain candidate semantic element and the object type is less than a cost of another path between the another candidate semantic element and the object type.

In a further implementation form of the first, second, and third aspects, for a certain term of the plurality of terms that corresponds to a plurality of model elements, a candidate semantic element corresponding to the certain term is selected according to a highest probability of a path between the certain term and a model element of the plurality of model elements corresponding to the candidate semantic element.

In a further implementation form of the first, second, and third aspects, a first candidate semantic element and a second candidate semantic element are not combined when no path is found within the hierarchical object model between a first model element corresponding to the first candidate semantic element and a second model element corresponding to the second candidate semantic element.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
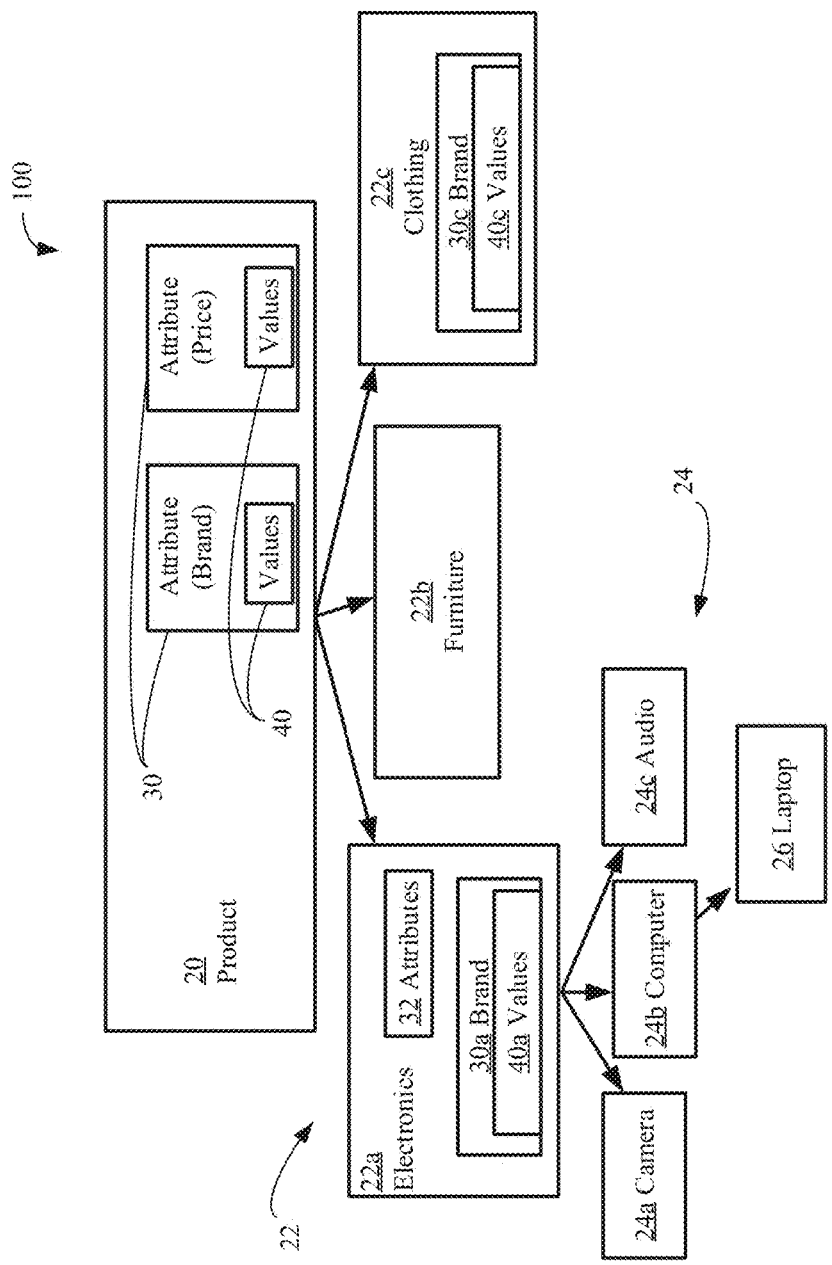
FIGS. 1A and 1B are schematic illustrations of exemplary portions of a hierarchic database model, according to some embodiments of the present invention.

An aspect of some embodiments of the present invention relate to a system and/or method (e.g., code instructions stored in a storage device executed by processor(s)) that enhance a search engine using a software interface (e.g., API) that communicates with the search engine. The API extracts features from object-related data (that may include unstructured data), to create structured object data. The structured object data is transmitted to the search engine (and/or to another computing device associated with the search engine) using the API. The search engine (and/or another computing device associated with the search engine) creates an enhanced object dataset. The enhanced object dataset is created from an existing object dataset used by the search engine by integrating the structured object data received from the API. The enhanced object dataset may be created by code associated with the API, the search engine, and/or by other code.

The enhanced structured object dataset is used by the search engine for searching using an interpreted search query received from the API. The interpreted search query is created by code associated with the API from a search query (e.g., a natural language query, an image) entered by a user for searching objects using the search engine. The interpreted query, when used by the search engine to search the enhanced indexed object dataset, enhances the search results returned by the search engine in comparison to a search engine executing the user entered query using standard methods on a standard object dataset. The interpreted query (and/or the search engine) may include additional instructions that define how the returned search results are processed by the search engine.

For example, the search engine may return results that are more relevant to the search query and/or results that are more highly ranked, in comparison to results that would be returned using standard searching methods. The search engine may dynamically adapt (based on the additional instructions) the processing of the results, for example, for the query chairs to return only chair products, and for the search query laptop return both laptop and laptop accessory products.

It is noted that as used herein, the term API denotes an exemplary but not necessarily limiting implementation of the software interface. Other software interfaces may be implemented. The term API used here may be substituted with other software interface implementations.

The structured product data of each product and interpreted search query enhance the search results returned by the search engine by reducing irrelevant results and/or providing the irrelevant results with lower rankings than additional relevant results and/or including relevant results which may not be found using standard methods. For example, when executed using standard search methods the query chair without wheels may result in chairs with wheels being ranked higher than chairs without wheels, because the terms chair and wheels both appear in product title/description/specs of chairs with wheels, whereas only chair appears in title/description/specs of chairs without wheels.

The API described herein solves the described technical problem, expressing a non-existence intent with respect to wheels in the interpreted query, resulting in the search engine correctly returning and/or ranking chairs without wheels. In another example, using standard methods, if smartphone cases are clicked on much more frequently than smartphones, the search engine might lead to black cases presented before black phones as results for the query black iphone. The API solves this technical problem by interpreting the product type intent correctly.

Some embodiments of the present invention provide a system and method for enhanced interpretation of product-related data, according to e-commerce expert knowledge (which may be manually entered and/or automatically learned by machine learning methods) implemented in a hierarchic product database model. The enhanced interpretation provided by some embodiments of the present invention facilitates transition of data from a website, e-commerce database or any other suitable data source, to an indexed model-based hierarchic database.

Arrangement of an e-commerce website product data in such model-based database facilitates interpretation of the database and the search terms according to the same model, and thus, for example, extraction of data that suits better the intentions of a user.

Some embodiments of the present invention provide a hierarchic database model representing comprehensive knowledge about cataloging and categorization of e-commerce products. The hierarchic model is used by a natural language analyzer (NLA) to provide enhanced indexing and search query interpretation, according to some embodiments of the present invention.

A hierarchic database model, according to some embodiments of the present invention, may include a hierarchy of concepts, i.e. database model nodes that represent product categories, rooted in a general super-concept of products such as e-commerce products.

A concept is a model element representing a certain kind of products or parts of products. For example, a concept "Chair" is the concept of all chair products, a concept "Laptop" is the concept of all laptop computer products, and the like. Concepts may include information about relations to other concepts, such as inheritance or meronomy (i.e. partonomy). For example, a concept "Seat" may represent a component of the concept "Chair" and therefore may include a meronomy relation to the Chair concept. Some concepts may represent products that may be sold as a separate product by themselves or as components of other products.

For example, a computer processor may be sold as a separate product or within a computer.

Each concept in the hierarchic model may have attributes representing properties of the concept and possible values of these attributes. For example, a Laptop concept may have a Weight attribute. For each attribute, the model defines the types of values that can be assigned to this attribute. Possible types of values may include, for example, a number, a string, a size (number+unit), and/or an instance of another concept.

The model may define a list of specific possible values that are allowed as values of the attribute, and/or it a range of possible values. For example, the model may define a minimal and maximal numeric value allowed for the attribute. In some embodiments, each attribute includes information about distribution of values of this attribute.

An instance of a concept represents an entity whose type is the concept. For example, an instance of the concept "mobile phone" may include a certain brand, color, size, and/or any other property of the instance. An instant of the concept has specific values of some or all of its attributes, i.e. an instance contains an assignment of specific values for some or all of its concept's attributes, in accordance with the defined value-types of the attributes as well as the possible values or value range defined for the attribute.

The interpretation system according to some embodiments of the present invention analyses texts and/or information input about products. The product-related data may be additional data which is not structured within a product-dataset that is searched by the search engine when standard methods are used. The systems and/or methods described herein analyze and make available such information for searching products, by extracting features from the additional product-related data, as described herein. Examples of external information sources that include product-related data that is passed to the API for feature extraction include non-text sources, for example images, videos, and/or other text-based sources for example, content of links associated with the product, and text sources such as, for example, user queries, specifications, titles, descriptions, overviews and/or reviews, and produces a structured representation of the input's meaning, formed of concepts, attributes, relations, values and/or constraints of the model.

The extracted features being analyzed may not carry any semantic meaning and/or be coordinated in advance with the search engine, for example, arbitrary codes that are produced by the code of the API (e.g., NLA) but are meaningless to the search engine may be used. For example, bar codes, QR codes, or other codes may be used. The codes may represent an encryption. For example, color=FX321435Y, blue=YY24wxd2. The arbitrary codes may be used internally by the code of the API (e.g., NLA), while remaining hidden from the user entering a query, and/or the search engine performing a search.

The extracted features may be distinct. The search engine may select a sub-set of the extracted features for use, and/or to relate to different features in a different way. For example for the search query blue leather chair, the corresponding interpreted search query (created as described herein) is [concept=chair, color=blue, material=leather]. The search engine may decide to use the concept as a filter, and return only chairs, and then to use the color and material to boost (i.e., show higher in the results) those which are blue and/or made of leather (allowing chairs from other colors and materials but not objects which are not chairs). The search engine may assign different significance to different extracted components.

According to some embodiments of the present invention, the interpretation system(s) and/or method(s) may execute a natural language analyzer (NLA) for interpreting terms in a context of product-related data according to the hierarchic product model.

The interpretation process may create a dedicated e-commerce database indexed and constructed according to the hierarchic product model by obtaining the NLA's term interpretations, and based on the interpretations indexing the product-related data into elements of the model-based database. Accordingly, a product-related data may be represented by elements of the model and the relations between them.

Further, the interpretation system provided by embodiments of the present invention may interpret by the NLA search queries and create model-based representations of the search queries, thus enabling a search server to perform model-based search in the website indexed database. A search server according to some embodiments of the present invention may match between the model-based representations of the search queries and elements of the model-based website database, thus finding in the database suitable products to output as search results.

The provided model-based database, searchable by the model-based representations of search queries, is designed to improve the way e-commerce data is stored and retrieved from the database, and thus improves the database operation.

By using the hierarchic model and the NLA provided by some embodiments of the present invention, the system and method described herein solves the problem of inaccurate search results in e-commerce website, and provides, in response to product-related searches, product suggestions that match the meaning of the search query as the user intended.

This is thanks to an indexed database based on a hierarchic model and implementation in the hierarchic model of common uses of terms and/or values and relations between terms and/or values, along with limited value-spaces and/or value distributions.

It will be appreciated that as used herein, a term may include one or more words.

An aspect of some embodiments of the present invention relates to systems and/or methods that use a software interface (e.g., API) to convert a search query into an interpreted search query for searching for objects by a search engine. The software interface converts the search query into the interpreted search query without necessarily modifying the internal code of the search engine, for example, the search engine transmits the search query received from a user to a computing device (e.g., server) using the software interface and executes the received interpreted search query which is received using the software interface. It is noted that the search engine's code might be adapted for communicating with the software interface (e.g., API) described herein.

The search query may include one or more terms which are not necessarily meaningful to the search engine and/or that are unmatchable to one or more products when searched by the search engine, and/or that return irrelevant results by matching to irrelevant products (i.e., not intended to be searched by the user). In the case where the search engine executes the query, for example blue dress, there may be products which may be exactly matched, but cannot be retrieved by the search engine because the products are not understood.

For example, the color may appear only in image(s) and not in text (the systems and/or methods described herein are able to identify from image(s) that the color is blue), the product may be wrongly listed in the shirts category (the systems and/or methods described herein are able to interpret that it's a dress regardless), and/or the color may be described as navy and the search engine doesn't know that navy is a form of blue (the systems and/or methods described herein are able to interpret that navy is a shade of blue).

It is noted that the search engine executing the interpreted search query may still return irrelevant results. Using the interpreted search query, the search engine may be able to improve ranking of the most relevant results, with the irrelevant results (that would otherwise be returned when searching using standard methods) being ranked lower.

For example, execution of the search query office chair with wheels using standard search methods often returns chairs, wheels, and wheel chairs. Furthermore, executing the search query office chair without wheels using standard search methods typically returns chairs with wheels first because the search engine is unable to interpret the significance of the term without.

In another example, the search term computers for kids may not be entirely understood by the search engine, as the term for kids may not be matched to any products. The search engine may return products that are different than the users intent, for example, returning books about teaching computers to kids, computer toys, and laptop covers with kids photos. The search engine can search for computers while ignoring for kids, thus returning computers that are irrelevant to kids, for example, expensive computers, computers with processing capabilities for advanced design work, and heavy desktop servers. Using the API and computing device described herein, the search engine may search using the interpreted search query, and return relevant results that are closer to the user's intent, for example, low cost computers, portable computers, computers designed for games, and ruggedly designed computers.

The computing device receives using the API, an input query entered by a user, for example, a text and/or image (e.g., typed, using a voice to text interface, selected from a list, uploaded, or other methods) defining the search query for one or more products. The search query is parsed into searched terms. Parsing may be performed by matching each term to model element(s) of a hierarchic product model (created as described herein).

For example, the term color (which may not be meaningful to the search engine) may be matched to one or more concepts that represent the attribute color in the hierarchic product model, and the term blue may be its value. Alternatively or additionally, the parsing may be performed by interpreting the search query based on linguistic set-of-rules (e.g., patterns), which may be stored, for example, as a set-of-rules, code, a look-up table, a mapping database, or other implementations. The linguistic set-of-rules may be, for example, manually programmed, and/or automatically learned using machine learning techniques. For example, for the search query smartphone under $1000, the term under may be interpreted as a quantitative inequality intent, which for the described example is based on price (i.e., price <1000). The term under may not necessarily be included in the hierarchic product model. In another example, for the search query cheap smartphone, the term cheap may be interpreted as price <700.

Each of the search terms is converted into one or more interpreted query terms, which may be based on synonyms and/or similar terms and/or hierarchy and/or element distance of the matching model element. For example, the term blue is converted based on hierarchy into navy and/or other shades of blue.

Element distance may also be referred to herein as weighted similarity.

In terms of element distance, different close elements may be assigned scores that denote a "distance" to the intent of search query. Distance may be computed or product types, attributes, and/or other parameters described herein. The distance may be a statistical distance, for example, computed based on a correlation, and/or a Euclidean distance within a space. In an example based on element distance between attributes, when a search is entered for a color of a product that is not available, for example the query bright orange business suit, the converted query may include instructions for the search engine to search for the nearest available color, for example, light brown business suit. In an example based on distance between products, when the search query is for sandals, the interpreted query may include instructions (optionally weighted instructions) to search for flip flops.

In another example, the term for kids may be converted into a set of attributes that are defined as for kids, for example, weight, portability, cost, size, and ruggedness. In yet another example, the term furniture might be converted into a list of multiple possible furniture types, for example, chair, table, sofa, cabinet, and the like. In yet another example, the term for kids may be an existing Boolean enhanced attribute defined in the hierarchic model (as described herein). The interpreted search query is created based on the interpreted query terms, and transmitted to the search engine using the software interface. The search engine uses the interpreted search query to search an indexed product dataset (created as described herein).

The systems and/or methods (e.g., code instructions stored in a storage device executed by one or more processors) described herein provide a technical solution to the technical problem of converting a search engine that searches for products in a product dataset (e.g., of an e-commerce site) into a search engine with enhanced search capability without necessarily reformatting the code of the search engine (apart from adapting the search engine for communication with the software interface). The enhanced search capabilities may include enhancing the ability of a search engine that is designed to receive text search queries to process images used as search queries, and/or to enhance the ability of the search engine to utilize natural language understanding (NLU) technology. The technical solution to the technical problem is based on a code interface (e.g., script, application programming interface (API), software development kit (SDK)) that interfaces with the search engine.

The interface (e.g., API) receives the search query from the search engine, converts the search query into an interpreted search query understood by the search engine when searching using the enhanced indexed product dataset, and provides the interpreted search query to the search engine for searching within the product dataset. The API may be used by a certain search engine, and/or by different search engines (e.g., having different internal architectures and/or different internal implementations) that may search different product-related datasets, regardless of the implementation of the search engine, and optionally while maintaining additional search result ranking considerations.

The systems and/or methods (e.g., code instructions stored in a storage device executed by one or more processors) described herein improve performance of a search engine executing on a search server, by extending the ability of the search engine to execute search queries, which may be written using natural language, and to retrieve relevant results based on the search query.

The performance of the search engine is improved without necessarily considering the implementation and/or modifying the product-related dataset that is normally searched by the search engine, by enhancing the general search engine index (that would otherwise be used by the search engine) using the features extracted from the product-related dataset, creating an enhanced indexed product dataset that is searched by the search engine using the interpreted search query based on the search query.

It is noted that the indexed product dataset may include the original dataset from which the product data was obtained, an external dataset external to the search engine, a dataset integrated with the search engine (e.g., the dataset currently being used by the search engine prior to enhancement), and/or a previous version of the indexed product dataset that is updated with the new structured object data.

The API (or other interface) described herein more accurately interprets the intent of the user entering the search query, improving the computational efficiency of the search engine by more accurately matching the search query to the available products. The search for products in the product dataset by the search engine is improved, to more accurately identify products relevant to the user's search query, and/or to more completely identify additional products that are relevant to the user's query and would not be available without using the API.

For example, improving the order of the result, and/or improving recall of objects that would be found without implementation of the API (many of the matches being irrelevant). The total search time it takes the user to find the object the user is interested in is thereby reduced, improving utilization of processor(s) of the search server, for example, by the user performing a single search that produces relevant results, rather than the user performing multiple searches using refined queries to try and locate the relevant results.

As used herein, the term semantic representation means a semantic structure that stores a structured representation of object-related data. The object-related data may be unstructured, for example, provided as text words (and/or symbols), and/or images (which may be analyzed and converted into a textual representation). The object-related data may be provided for example, in the form of a user search query for searching for a certain object, and/or in the form of an object-listing (e.g., specification, description, and/or title). The object-listing may include a product-listing. The semantic representation may be stored as a hierarchical semantic structure of semantic elements. Terms (individual or in groups) of the unstructured object-related data correspond to semantic elements, where each semantic element is mapped to an ontology element (also referred to herein as a model element), as described herein.

The semantic representation denotes an unambiguous representation of the unstructured object-related data that may store ambiguous data (e.g., ambiguous language terms). The semantic representation indicates hierarchical relationships between terms of the unstructured object-related data. The semantic representation is created from the object-related data as described herein. The semantic representation created from a search query is included in the interpreted search query described herein for searching by a search engine. The search engine matches the semantic representation (of the interpreted search query) with one or more modeled object representations stored in an enhanced indexed object dataset. The semantic representation enables a semantic match between the information conveyed in the search query and the information conveyed in one or more objects.

The semantic representation created from object-related data of a product is included as structured data for indexing in the enhanced indexed object dataset described herein.

As used herein, the term canonical object and modeled object representations may be interchanged. The canonical objects are defined by a semantic ontology, and may be stored as records in a dataset. As used herein, the terms semantic ontology and product database model and hierarchical object model may be interchanged.

For example, both the term "laptop" and the term "notebook", when provided in the object-related data (e.g., user query) map to the ontology object LaptopComputer stored in the semantic ontology. It is noted that the mapping to LaptopComputer is performed when the rest of the content (i.e., other terms) of the object-related data indicates that the user intent is to search for a laptop computer.

As used herein, the terms ontology element and model elements may be interchanged.

As used herein, the term semantic element may refer to one or more terms (individual or in groups) of the object-related data (e.g., search query). The hierarchical semantic representation includes a hierarchical relationship of semantic elements. Each semantic element maps to one or more ontology elements (i.e., model elements) of one or more canonical objects (i.e., modeled object representations). For example, for the search query "table with green glass top", the hierarchical semantic representation stores the information that the semantic element "top" maps to the model element TableTop, that the model element TableTop has a hierarchical relation Component_of to the model element Table, and that the semantic element "glass" maps to the model element GlassMaterial which has a hierarchical relation Material_of to the model element TableTop. The possible hierarchical relationships of the model elements are defined in the semantic ontology.

As used herein, the term basis semantic element refers to a semantic element that defines the object type (i.e., the main object type) of the semantic representation, for example the main product type, such as Smartphone, Table, or Dress.

As used herein, the term ambiguous refers to one or more terms (i.e., semantic elements) that map to multiple canonical objects and/or multiple model elements. The ambiguity arises when it is unclear what the user intent actually is in relation to the term(s), since the user cannot intend to mean two different things. For example, the term "notebook" may indicate a user intent to search for a laptop computer or a paper booklet. On its own, the term "notebook" is ambiguous, mapping to both the ontology elements LaptopComputer, and PaperNotebook. As described herein, the ambiguity is resolved according to additional terms of the object-related data (e.g., search query) that are compatible with (e.g., map to) either the canonical object LaptopComputer, or with the canonical object PaperNotebook, but not with both.

As used herein, the term object type may refer to the concept model element described herein.

An aspect of some embodiments of the present invention relates to systems, methods, an apparatus, and/or code instructions (stored in data storage device and executable by one or more hardware processors) for converting input data (e.g., search query, object-related data such as a product listing) into a semantic representation. The input data is received via a software interface, for example, an application programming interface (API), and parsed to identify term(s). The terms are converted into corresponding candidate semantic elements. Each candidate semantic element maps to model element(s) of a hierarchical object model. One of the candidate semantic elements is designated as a basis semantic element indicative of an object type. The basis semantic representation is set as a root of a tree data structure representation of the semantic representation. A subset (e.g., all or less than all) of the candidate semantic elements are combined to create the semantic representation.

The subset of candidate semantic elements are combined according to a path requirement (optionally lowest path cost) between the model elements of the hierarchical object model corresponding to the subset of candidate semantic elements, and the object type of the hierarchical object model corresponding to the basis semantic element. The semantic representation stores a hierarchical structure of the subset of candidate semantic elements connected to the basis semantic element by semantic relations. Structured data (e.g., structured search query, structured entry of the object (e.g., product) may be created based on the semantic representation. The structured data is provided to a search engine and/or search server via the software interface. A search engine may execute the structured search query, and/or index the structured entry into an enhanced object database.

Some implementations of the systems, methods, apparatus, and/or code instructions (stored in a data storage device and executable by one or more hardware processors) described herein address the technical problem of improving the computational efficiency of a computing device that computes the semantic representation for unstructured object-data, for example, a text query, and/or a text record of the object. The improvement in computational efficiency of the computing device may include, for example, a reduction in time to perform the computation using available computational hardware, an improvement in utilization of available computational hardware (e.g., processor(s)) to perform the computation, and/or an improvement in utilization of available data storage devices (e.g., memory) to perform the computation.

The improvement in utilization of available computational hardware and/or available data storage devices improve performance by utilizing available resources rather than requiring an increase in the available resources.

The technical problem may be related to improving the efficiency of searching in a space of possible (optionally all possible) semantic representations based on the semantic elements identified in the object-related data (e.g., text). The goal is to find the representation with the lowest possible cost that covers as much of the input semantic material as possible. A naïve search within the space incurs high computational costs based on an examination of a large number of combinations, for example, in terms of a long processing time, and/or in terms of high processor utilization and/or high memory utilization.

The technical problem may be related to improving the efficiency of computing the semantic representation for an object listing (e.g., product listing). A method that only considers searching for keywords in titles of the object listing to identify the object type (e.g., product type) are ineffective and/or computational inefficient, for example, expressions that are ambiguous are confusing (e.g., an expression that in general may refer to the object type, but does not refer to the object type in the specific context such as within a title). In another example, expressions that may serve as the main object (e.g., product) type but in the specific context of a title serve as a component of the main product type and not as the main product type itself. In yet another example, no explicit product type is mentioned in the title, and hence inference of the implicit product type is required. When a full semantic analysis of additional data of the object listing is performed (e.g., the product specification) based on a naïve method that considers a large number of combinations, the accuracy of computing the semantic representation may be increased but at a cost of computational inefficiency, as described herein.

Some implementations of the systems, methods, apparatus, and/or code instructions described herein improve computational efficiency of a computing device in accurately identifying the main object type (e.g., main product type) from the object-related data (e.g., product listing). The improvement in computational efficiency arises, for example, in the analysis of a product (e.g., object) title by the systems, methods, apparatus, and/or code instructions described herein, which quickly zone in on the basis semantic element having the greatest potential. The basis semantic element may yield the title's main product type, even without performing a full semantic analysis of the entire title.

Computational efficiency of the computing device may be improved based on the efficiency and/or fast access to the hierarchical object model to compute the path cost. The path costs may be computed offline a single time and/or stored in memory that is accessed at run-time during analysis of the text input data. The fast and/or efficient access of the hierarchical object model to obtain the path costs provides improved computational efficiency for example, in terms of reduced processing time.

Computational efficiency of the computing device may be obtained based on the combination of the candidate semantic elements performed with no decision points, or with fewer decision points that would otherwise occur in the naïve implementation described herein, which reduces total computational processing resource utilization and/or processing time.

The technical problem of improving the efficiency of computing the semantic representation is based on multiple factors, for example: (i) Ambiguities of language expression, where a certain expression has multiple possible meanings, all of which may be considered in a naïve search, which generates a large number of combinations. (ii) Implicit reference, where the main object type (e.g., type of product) does not explicitly appear in the object-related data (e.g., object type is not listed in the search query), and therefore leads to generating a large number of possible candidates for the main object type which are inferred from other terms of the object-related data. (iii) Irrelevant terms in the object-related data (e.g., irrelevant and/or contradictory text in the search query), which are skipped during the search, generating an even larger number of combinations when considering the possible sub-sets (e.g., permutations) of terms that may need to be skipped in order to find a consistent and coherent semantic representation.

Inventors tested some implementations of the systems, methods, apparatus, and/or code instructions described herein, and discovered that for an ambiguous search query, the object (i.e., product) type was correctly narrowed down to one option, in about 80-90% of the queries, depending on the source of the queries. Analysis showed that the latency for the search queries is improved by about 50%. The latency for detection of object (i.e., product) type when the input data includes an object (i.e., product) listing is reduced by about 75%, while obtaining an accuracy of about 95% for detection of the main product type.

The factors affecting efficient computation of semantic representations are now discussed in additional detail.

(i) Ambiguous terms—Natural language texts include terms that are ambiguous, having multiple possible meanings. A certain term extracted from the object-related data potentially maps to multiple model elements. In such object-related data (e.g., text search query, text product listing), the proliferation of possible model elements incurs a significant increase in processing time due to a rapidly increasing number of combinations that are processed. The combinations arise since the potential interaction of each model element with all other model elements must be evaluated in a naïve implementation to make sure that the different model elements are linked in an optimal semantic inter-relationship(s), rather than being joined together in an illogical or irrelevant manner. It is noted that most of the processing is wasted effort, as most of the checks of the combinations discover that there is no valid semantic relation between the model elements.

For example, for the search query "red keyboard qwerty", the term "keyboard" is ambiguous since the term "keyboard" may refer to a computer Keyboard or a musical instrument Keyboard. The interaction between all the multiple elements requires investigation to determine the actual intent of the user. In a naive implementation, both types of "keyboard" may connect to the attribute "red", yielding two larger elements covering "red keyboard", although only one of the elements may actually be connected to "qwerty". The computational processing that was performed to construct an element connecting the music Keyboard with "red", and then the attempt to connect the combined element with "qwerty" is wasted effort.

When there are several additional elements in the query, most of which are able to connect to either type of Keyboard, and only the last element that is checked helps to disqualify the incorrect meaning, the total processing resources executed as a wasted effort may add up to a significant amount. The amount of wasted processing effort is further increased when the other two factors mentioned in the previous paragraphs leading to processing inefficiency are encountered as well.

(ii) Implicit inference—Implicit referencing is performed for an object-related data (e.g., search query) in which the object type (e.g., product type) is not explicitly stated in the query, for example, "long sleeves", "galaxy s" and "red". Since the product type is not explicitly stated, inference of the product type is carried out. The different possible paths in the hierarchical object model (i.e., semantic ontology) that lead from the model elements corresponding to terms of the query to potential main product types are explored.

Based on the example queries above, since "sleeves" means Sleeve which is a component of a Dress, the main product type Dress is inferred. Since "galaxy" and "s" are a series and model terms of a Smartphone, the product type Smartphone is inferred for the query. Similar inferences may be based on colors, materials, brands, collections, and more.

When all possible inferences are considered then processing efficiency is significantly reduced (e.g., processing time increases significantly). In most cases, a large number the explored implicit inferences are later discarded when they lead to dead ends, for example, the inferred object type is incorrect in view of other terms in the query.

For example, for the query "red long sleeved maxi dress", a naive implementation infers product types from each of the terms "red", "long sleeved" and "maxi" (it is noted that each of these terms is a legitimate query by itself). Each one of the inferred product types may connect to all of the other terms, and so the final semantic representation may be redundantly obtained in several different ways, which reduces computational efficiency (e.g., increasing processing cost). Moreover, in this example case, the product type is explicitly stated ("dress"), and so the implicit product type inference is superfluous.

(iii) Irrelevant terms (i.e., dead material)—the object-related data (i.e., input text) may include one or more terms that cannot be used in a final interpretation of the object-related data. Some exemplary reasons include: (A) The term is a garbage token, for example, a spelling mistake that was not caught by the spelling corrector. (B) The term has a corresponding entry known in the hierarchical object model (e.g., lexicon), but none of the possible known meanings connect to the rest of the semantic material in the input text. (C) The term contradicts some other part of the input text. For example, for the text "dell laptop hp", two different (and incompatible) brands are mentioned ("dell" and "hp"). An interpretation can utilize only one of the brands and must ignore the other. In an implementation that skips (i.e., ignores) a problematic term, it is not known in advance (before processing starts) which term(s) are the problematic terms that should be skipped so that the remaining elements can be combined to form a consistent and coherent semantic representation.

As such, permutations in which one or more terms should be skipped are created, resulting in a significant number of sets of terms to analyze to determine the permutation that yields the best coverage of the input text with the fewest number of skips. However, such processing reduces computational efficiency (e.g., incurs an expensive cost in processing time), since allowing skips adds a large number of additional options that are investigated. For example, allowing to skip over one term multiplies the number of processing steps by a factor of N=the number of terms. Skipping over two terms multiplies by a factor of N^2, and so on until the number of terms skipped over is one less than the total number of terms extracted from the input text.

Some implementations of the systems, methods, apparatus, and/or code instructions described herein address the technical problem by computing the semantic representation according to the lowest possible cost between as many of the semantic elements identified within the received object-related.

Some implementations of the systems, methods, apparatus, and/or code instructions described herein improve the computational efficiency of a computing device computing the semantic representation for an object listing (e.g., product listing), in particular for fields of the object listing that store long values (e.g., bullets, description fields storing free style text). The computational improvements include, for example, reduced processing time, and/or reduced utilization of processing resources and/or reduced utilization of data storage resources.

The computational improvement may result from selection of the basis semantic element and path connected candidate semantic elements as described herein, which filters out meanings that do not have an ontological connection to the context (e.g., main product type and possible ontological paths). The remaining relatively small number of relevant semantic elements may be efficiently combined into the semantic representation.

The systems and/or methods (e.g., code instructions stored in a storage device executed by one or more processors) described herein improve an underlying technical process within the technical field of search engines that search for products in a product-related dataset. The systems and/or methods (e.g., code instructions stored in a storage device executed by one or more processors) described herein may improve an underlying technical process within the technical field of NLP.

The systems and/or methods (e.g., code instructions stored in a storage device executed by one or more processors) described herein are tied to physical real-life components, including search servers, and data storage devices.

Accordingly, the systems and/or methods described herein are inextricably tied to computing technology and/or are network-centric to overcome an actual technical problem arising in processing of search queries by a search server.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Python, Javascript, Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term natural language search query means a search query entered using human understood words and terms, in any language. The terms may be found in a dictionary, or commonly understood terms not necessarily found in a dictionary, for example, slang words. It is noted that the natural language search query may not necessarily be grammatically correct, or following conventional language structure. For example, the following natural language search queries may be entered by a user to mean a query a dress with a v-style neck which is also blue: blue v-neck dress or dress v-neck blue which is not even proper English.

The term search query used herein may refer to natural language search query, and/or to a query extracted from an image (also referred to herein as query image). It is noted that the image query is not necessarily used to search for image similarity. Features (e.g., textual based features) may be extracted from the image query for searching for objects that are similar in the enhanced index object dataset.

As used herein, the terms product, listing, and object may be interchanged. For example, when the objects being indexed and/or searched are not necessarily products, but representing other items that are searched by the search engine.

As used herein, reference to the natural language analyzer (e.g., 68 in FIG. 3) may include model 100, for example, the natural language analyzer may be integrated with the model as a single component.

Figure 1B:
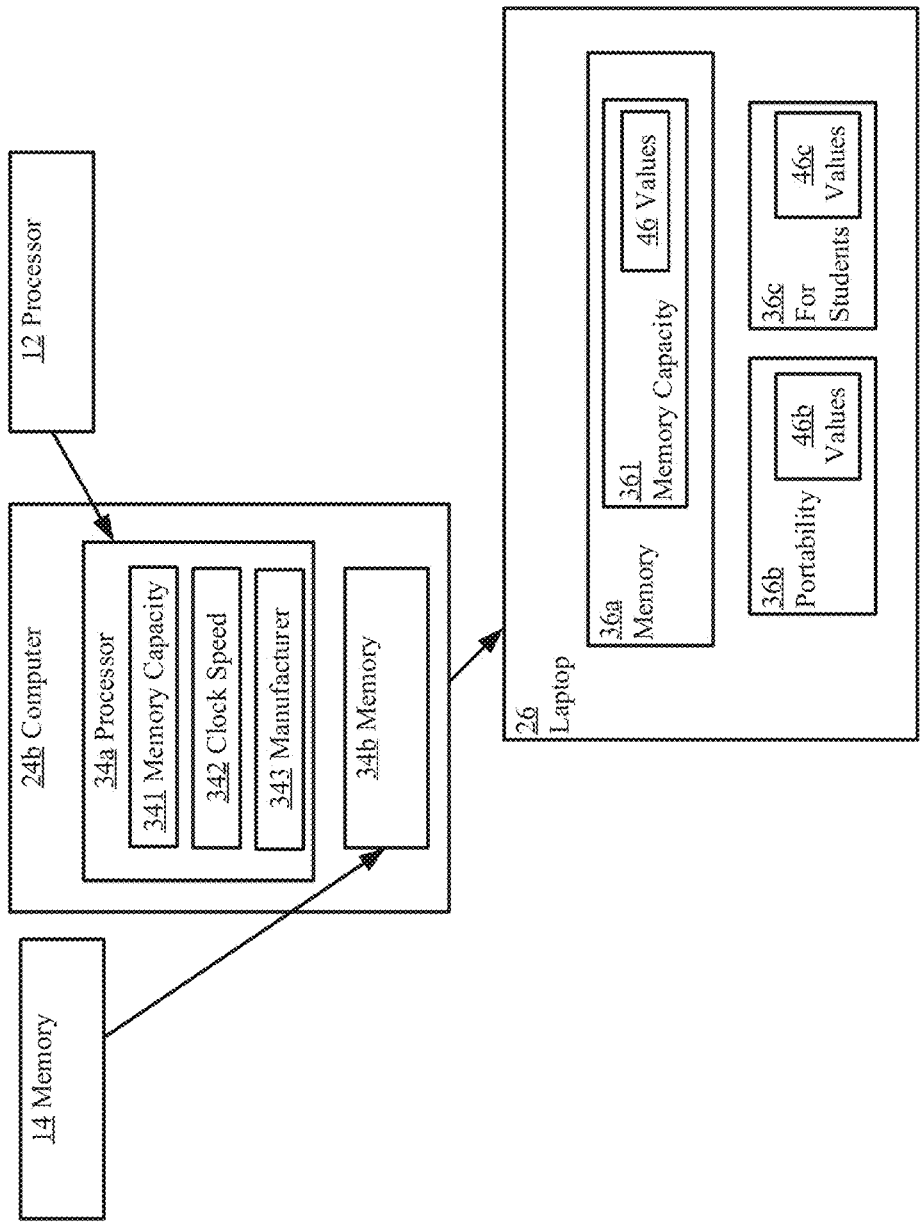

Reference is now made to FIGS. 1A and 1B, which are schematic illustration of exemplary portions of a hierarchic database model 100, according to some embodiments of the present invention. As discussed herein, the top of model 100 may be a Product super-concept 20, representing a general concept of products or e-commerce products. Product super-concept 20 has attributes 30 such as, for example, Brand, Price, Place of Manufacture, and/or any other suitable product attributes. Each attribute may include a possible value space 40.

Model 100 includes inheriting concepts 22 which inherit attributes 30 directly from Product super-concept 20 and optionally may include further attributes 32. An inheriting concept 22 may restrict a value space 40 of an attribute 30 to possible values that are relevant to the concept 22. For example, inheriting concept 22 may include Electronics concept 22a, Furniture concept 22b, Clothing concept 22c, and/or any other suitable concept that inherit directly from Product super-concept 20. A value space 40a of Electronics Brand attribute 30a of Electronics concept 22a, is restricted to electronics brands and may exclude, for example, the value 'Zara' that may belong to a value space 40c of Clothing Brand attribute 30c of Clothing concept 22c.

Several inheriting concepts 24 may inherit from an inheriting concept 22. For example, Camera concept 24a, Computer concept 24b, Audio System concept 24c and/or any other suitable concept may inherit from Electronics concept 22a. Each of these may have inheriting concepts as well, and so on. For example, a Laptop Computer concept 26 may inherit from Computer concept 24b.

Some attributes may include instances of concepts, for example concepts with specific values. For example, a Computer Processor attribute 34a of Computer concept 24b may include an instance of a Processor concept 12, and/or a concept inheriting from the Processor concept.

The Computer Processor concept represents both a stand-alone product that may be sold separately and a component of a Computer concept 24b. Similarly, a Memory attribute 34b of Computer concept 24b may include an instance of a Memory concept 14, and/or a concept inheriting from the Memory concept. Such instances may have their own attributes, i.e. secondary attributes. An instance value in a Computer Processor attribute 34a may have secondary attributes such as, for example, Memory Capacity attribute 341, Clock Speed attribute 342, Manufacturer attribute 343, and or any other suitable attribute of a computer processor. Each attribute may have a corresponding possible value space. For example, a Memory Capacity attribute 361 of instances in a Memory attribute 36a of Laptop concept 26 has a possible value space 46a, possibly stored along with the distribution of possible memory capacity values.

Some attributes are enriched attributes, i.e. attributes that are calculated based on other attributes, based on formulas representing domain expert knowledge and/or based on automated machine learning code about relationships between the attributes. For example, a Portability enriched attribute 36b may have a value space 46b of values indicating how portable the laptop is. The values are calculated based on various attributes such as weight, size, battery life and/or other suitable attributes.

For example, Suitability for Students enriched attribute 36c may have a value space 46c, the values of which may be calculated based on price, portability and/or other suitable attributes. Some attributes may have Boolean values, such as true or false. For example, Boolean value attributes may be attributes that define a type and/or suitability for certain application and/or use, for example, Waterproof (yes or no) or For Students (yes or no), and/or attributes that define inclusion of a certain feature, such as SD Slot (included or not) or USB Port (included or not), and/or other suitable attributes. When attributes are not explicitly defined, the API may deduce the exclusion of the attribute. For example, for a laptop for which a USB port is not explicitly defined, the API may deduce that no USB port exists and create the attribute USB Port=NO.

A NLA according to some embodiments of the present invention analyses, by using model 100, various texts about products, such as, for example, user queries, specifications, titles, descriptions, overviews and/or reviews. Based on the analysis, the NLA produces a structured representation of the texts' meaning, formed of concepts, attributes, relations, values and/or constraints of model 100.

Figure 2:
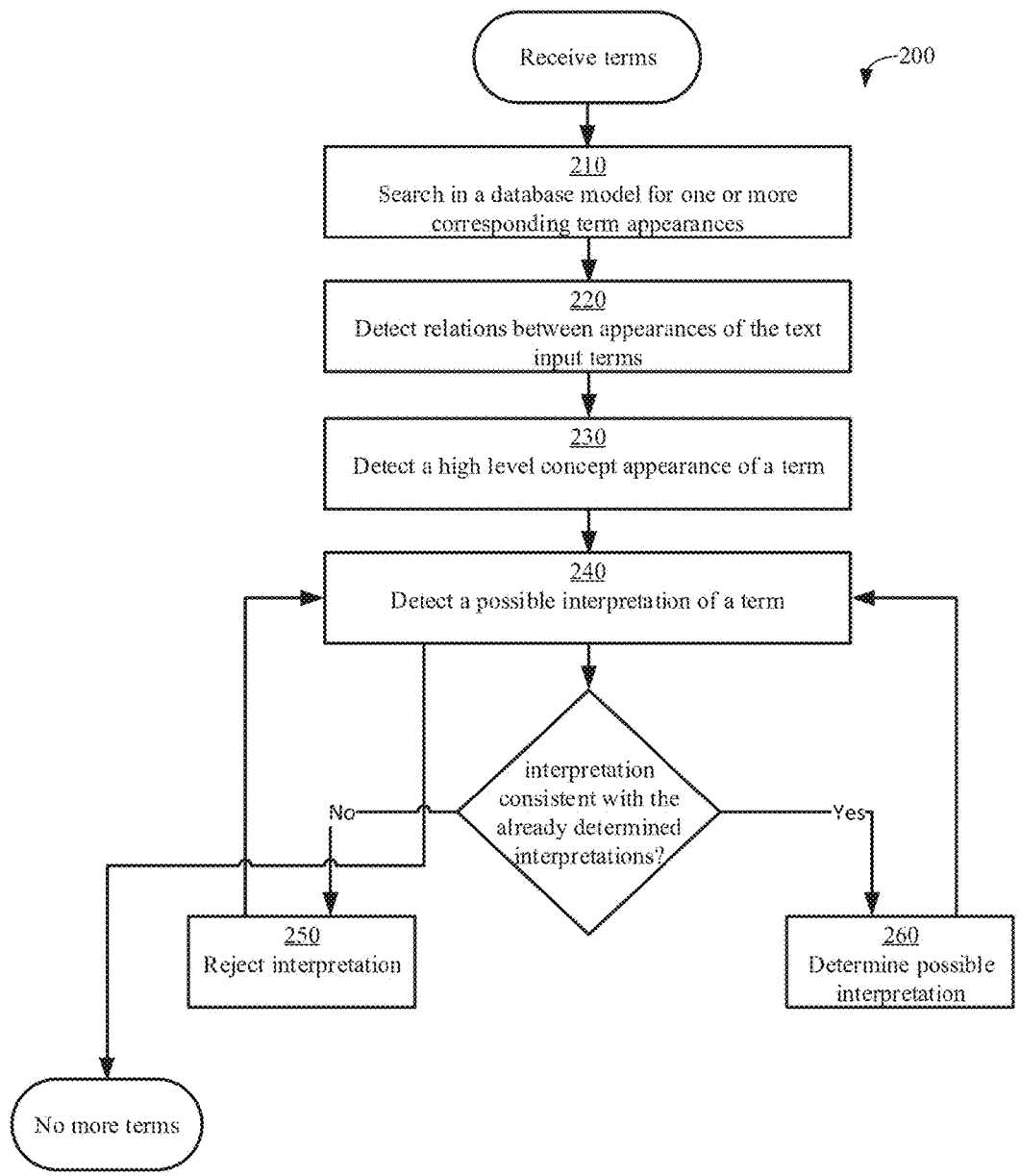
FIG. 2 is a schematic flowchart illustrating a method for interpretation of product-related data, according to some embodiments of the present invention.

Reference is now made to FIG. 2, which is a schematic flowchart illustrating a method 200 for interpretation of product-related texts, according to some embodiments of the present invention. Further reference is made to FIG. 3, which is a schematic illustration of a system 300 for interpretation of product-related texts and/or other information, according to some embodiments of the present invention. It is noted that the method described with reference to FIG. 2 may be executed by one or more processors of the computing unit described below with reference to FIG. 6.

System 300 includes an interpretation server 60 and a product model repository 62. Product model repository 62 may store model 100. Interpretation server 60 may include at least one processor 64, which may control and/or execute an indexing engine 66 and/or a NLA 68. As described herein, the API (or other software interface) provides an interface to the NLA 68. Optionally, as described herein, search server 90 accesses NLA 68 using the API, to provide the search query and receive the interpreted search query. The API may be implemented as the outermost layer of NLA 68.

It is noted that the NLA 68 described herein, and/or model 100 described herein are exemplary not necessarily limiting implementations that are accessed using the API. Other and/or additional code instructions defining other implementations may be used, for example, code instructions that analyze images, and/or code instructions that analyze structured features (i.e., non-natural language representations) and/or other code instructions that extract features to create the structured product data described herein and/or other code instructions that convert the search query (e.g., user entered, text and/or image) into the interpreted query described herein.

Interpretation server 60 may receive query input, for example a string of text relating to an e-commerce product, interpret the terms in the query input by NLA 68 and based on model 100, and create a modeled representation of the query input by indexing engine 66, in accordance with model 100. The query input may include text input, and/or structured data for example an attribute (e.g., color=blue), and/or an image.

It is noted that in some implementations (e.g., as described herein) search server 90 may store code instructions for executing indexing engine 66 to create indexed product dataset 70, when the implementations is based on API providing structured product data based on the product-related data for integration in the enhanced indexed product dataset 70.

As described in more detail herein, modeled representations of product-related data from a data source 80 may be stored structured product data that is integrated into an enhanced indexed product dataset 70. As further described in more detail herein, interpretation server 60 may use NLA 68 to generate representations of the search query according to model 100, thus enabling a search server 90 to perform search in indexed product dataset 70 according to the modeled representation of the search query.

For a term in the query input, as indicated in block 210, NLA 68 finds in model 100 stored in product model repository 62 one or more corresponding term appearances, which may include, for example, the same term, a similar term and/or a synonym. Each term appearance represents an interpretation of the term. A term appearance may be a concept, an attribute, or a value. Each term appearance has a location in the model, indicative of related concepts, attributes and/or values. It is noted that terms may be obtained from images, for example, by image processing code that converts images and/or portions of images to text and/or to attributes.

As indicated in block 220, NLA 68 may detect relations between appearances of the text input terms. Then, as indicated in block 230, NLA 68 may detect appearance of a term as a high-level concept in model 100. A high-level concept appearance may be a concept of high or highest hierarchy, for example relative to other concepts and/or appearances of the received query input. For example, a high-level concept appearance may be a concept that concept appearances of other terms of the same input inherit from directly and/or indirectly, and/or that attribute appearances of other terms are attributes of the high level concept or an inheriting concept.

Such high level concept appearance may be used to limit the possible interpretations of other terms. An interpretation that is not related to the detected high level concept may be rejected by NLA 68. At this stage, as indicated in block 240, NLA 68 may detect possible interpretations of at least some of the terms, i.e. determine that term appearance is possibly a correct interpretation of the term in the specific query input, for example, according to a relation of an interpretation to the high level concept.

Some concepts, attributes and/or values in model 100 may limit the possible interpretations to certain concepts, attributes, value spaces and/or values of the attributes. NLA 68 may filter the term appearances according to appearances of other terms of the same query input, in order to find the possible interpretations. That is, as indicated in blocks 250 and 260, NLA 68 may reject interpretations that are not consistent with the already determined interpretations, and determine further possible term interpretations, and so on, until no more interpretations can be determined and/or rejected.

In some embodiments of the present invention, system 300 may communicate with a user to request clarifications from a user regarding the input query. For example, when there is more than one possible interpretation, system 300 may ask for additional information to decide between the possible interpretations.

In some embodiments of the present invention, NLA 68 may receive along with a query input an indication of a product and/or a certain product instance, to which the query input relate.

In some embodiments, NLA 68 may receive along with a query input an indication of a concept and/or an attribute to which the query input relate. For example, NLA 68 may receive values of a processor's attribute along with an indication that the values pertain to a Processor concept, and/or along with an indication of a certain laptop model that the values pertain to. Accordingly, NLA 68 may limit the search for term appearances to attributes of a processor.

For example, NLA 68 may find an appearance of a term as a value of a Processor attribute, a Processor's Manufacturer attribute, a Clock Speed attribute, or a value of any other suitable processor's attribute. Since the term processor may have appearances as a concept or as an attribute which is also a concept, NLA 68 may also receive an indication of a concept to which the instance of the Processor attribute relate, such as a computer, a laptop computer, or another suitable machine. For example, NLA 68 may receive a query input "Intel 2.2 GHz" along with an indication that this is a value of a processor of a laptop. NLA 68 may search model 100 under the Laptop concept and the Processor attribute, and may find an appearance of "Intel" as a value of a Processor's Manufacturer attribute, and/or an appearance of "2.2 GHz" as a value of a Processor's Clock Speed attribute. Accordingly, NLA 68 may create a modeled product representation, wherein each value is ascribed to a certain concept and/or attribute.

For example, a certain Laptop product is represented by a Laptop concept instance, for which "Intel" is a value ascribed to a Manufacturer attribute of a processor concept/attribute, and/or 2.2 GHz is a value ascribed to a Clock Speed attribute of a processor concept/attribute.

In some embodiments of the present invention, interpretation server 60 uses instances of concepts that are implemented in the model. For example, NLA 68 may recognize that "Intel" is an instance of a "brand" or "manufacturer" concept, based on implementation of this knowledge in the model. In some embodiments of the present invention, instances of concepts are generated, for example based on the NLA's ability to recognize such instances in the query input. For example, interpretation server 60 may add to the model an instance of a concept "chair", such as "safety chair", in case the safety chair instance is needed for the interpretation process.

As mentioned above, system 300 may produce an indexed product dataset 70 based on product-related data, for example product-related text, obtained, for example received and/or extracted, from a product-related dataset stored in a data source 80. Data source 80 may be, for example, an e-commerce website or a dataset gathering knowledge about products presented in a website. More specifically, indexing engine 66, controlled by interpretation server 60, may use NLA 68 to create indexed product dataset 70, by indexing product-related data according to model 100.

Product dataset 70 may be dedicated and/or formed according to a specific data source or to a group of data sources. The product-related data may include a product specification, a table of a product's features, a table of values of a product's features, a product title, a product description, and/or any other suitable features about a product.

Figure 4:
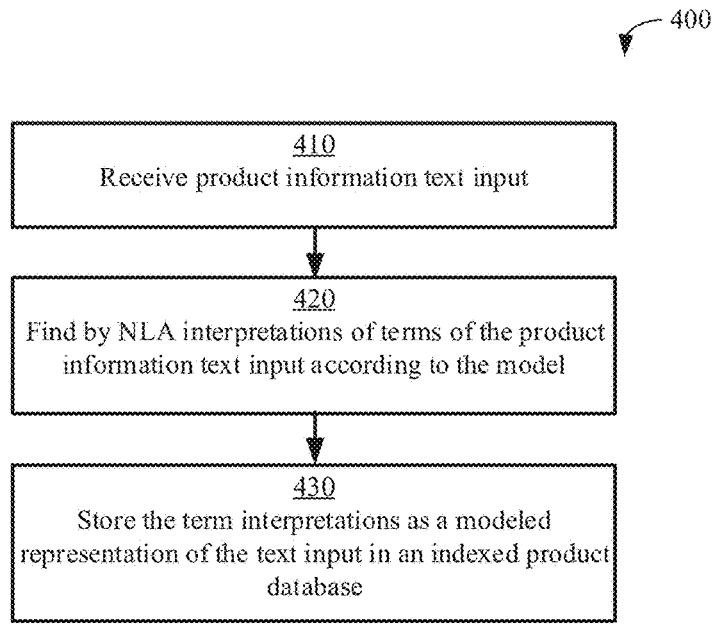
FIG. 4 is a schematic flowchart illustrating a method for creation of an indexed product dataset, according to some embodiments of the present invention.

Further reference is now made to FIG. 4, which is a schematic flowchart illustrating a method 400 for creation of indexed product dataset 70, according to some embodiments of the present invention. The method described with reference to FIG. 4 may be implemented by system 600 described below with reference to FIG. 6.

Figure 6:
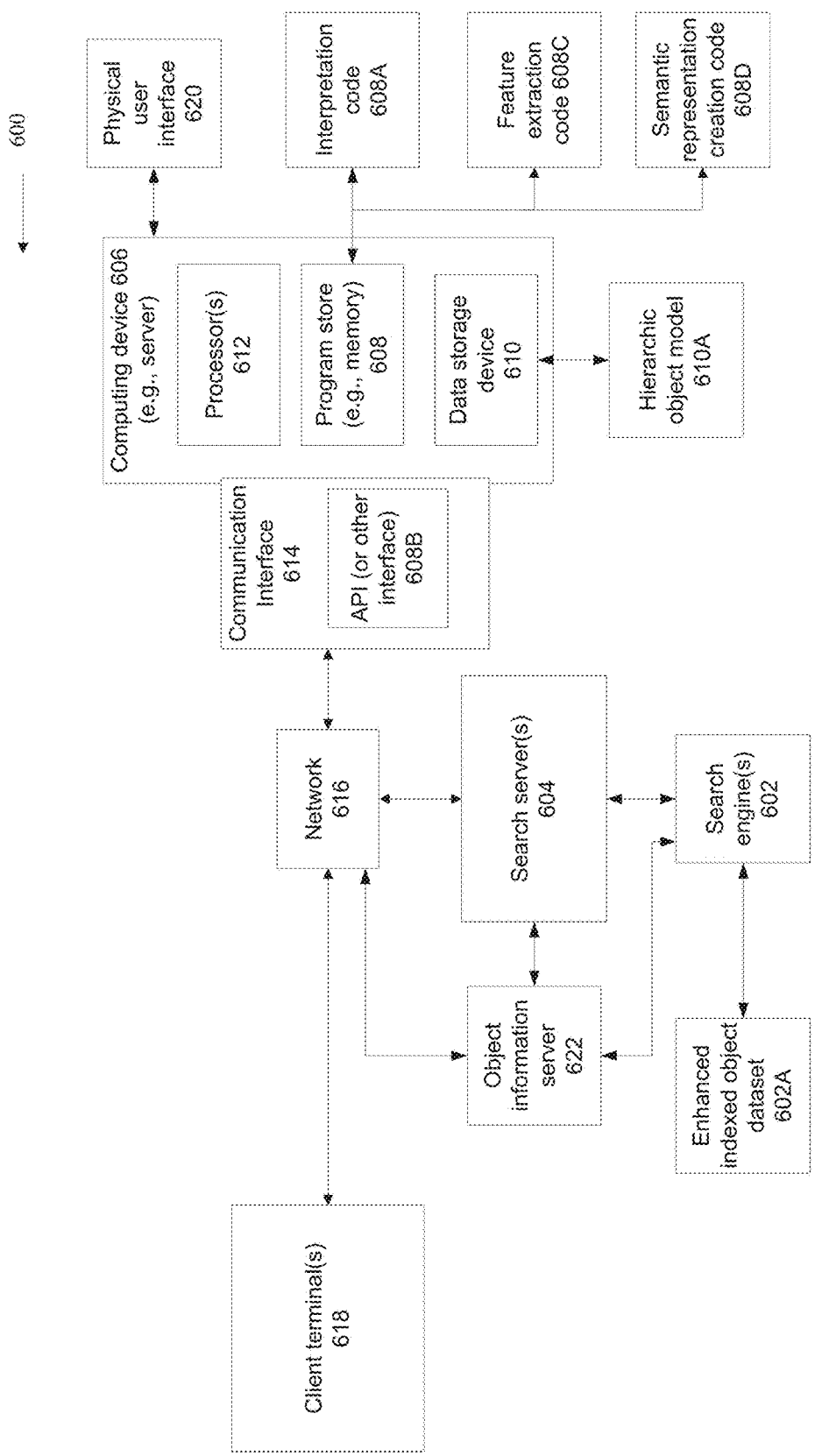
FIG. 6 is a diagram of components of a system that converts a search query into an interpreted search query for execution by a search engine, in accordance with some embodiments of the present invention.

Reference is now also made to FIG. 6, which is a diagram of components of a system 600 that uses API 608B to receive a search query, and convert the search query into an interpreted search query for execution by a search engine 602 of a search server 604 using an enhanced indexed object (e.g., product) dataset 602A, in accordance with some embodiments of the present invention. System 600 uses API 608B to receive product-related (and/or object-related) data from product (or object) information server 622 and/or from search server 604 and/or search engine 602, extract features from the product-related (and/or object-related) data using feature extraction code 608C, and optionally integrate the extracted features to create enhanced indexed product (or object) dataset 602A, and provide enhanced indexed product dataset 602A to search server 604 for searching by search engine 602. Alternatively, the extracted features are provided to search engine 602 using API 608B, and search engine 602 (or other code) integrates the extracted features to an existing indexed object dataset to create and/or update enhanced indexed object dataset 602A. System 600 may be based on, incorporated with, and/or include one or more components of system 300 described with reference to FIG. 3.

System 600 includes a computing device 606, which may be implemented, for example, as a server, a web server, and a computing cloud. Computing device 606 may correspond and/or be integrated with one or more components described with reference to interpretation server 60 of FIG. 3. Computing device 606 may store code instructions that perform the features describe with reference to one or more of: natural language analyzer 60, product model repository 62, model 100, indexing engine 66, and/or indexed product dataset 70.

Computing device 606 stores (e.g., in a program store 608 and/or data storage device 610) interpretation code 608A that converts a search query into an interpreted search query for execution by search engine 602, which is accessible using an interface 608B, optionally an API. API 608B conforms to one or more communication protocols defining transmission of data over network 616, for example, HTTP (hypertext transfer protocol). API 608B may be hosted by computing device 606, located externally and remotely from the search server hosting search engine 602. Computing device 606 stores feature extraction code 608C that extracted features that may be added to an index generally created by the search engine to create enhanced indexed product dataset 70 (and/or 602A), for example, as described with reference to system 300 of FIG. 3 and/or with reference to the method of FIG. 2 and/or FIG. 4. The extracted features may be added to enhanced indexed product dataset 602A by the API and/or other code (e.g., by the search engine and/or search server). Computing device 606 may store model 100 (and/or 610A). Computing device 606 stores semantic representation creation code 608D for computing a semantic representation for input data, for example, as described with reference to FIG. 10.

Interpretation code 608A executed by computing device 606 is located externally to the code of search engine 602, and is implemented without modification to the code of search engine 602. Search engine 602 accesses interpretation code 608A using API 608B.

Alternatively, system 600 may be implemented based on other architectures. For example, components of computing device 606, optionally the code instructions (e.g., 608A-C) may be integrated with and/or stored on search server 604. The integration may be implemented as, for example, a single computing device executing interpretation code 608A-C (in which case API 608B may conform with one or more programming languages), different virtual machines executing the respective features of search server 604 and computing device 606, or two locally connected devices where network 616 is a point-to-point network or a cable (or short range wireless link) connecting the two devices.

Computing device 606 includes one or more processors 612 (e.g., corresponding to processor 64) that execute interpretation code 608A-C. Processor(s) 612 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 612 may include one or more processors (homogenous or heterogeneous), which may be arranged for parallel processing, as clusters and/or as one or more multi core processing units.

Program store 608 stores code instructions implementable by processor(s) 612, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Computing device 608 may include a data storage device 610 for storing data. Data storage device 610 may be implemented as, for example, a memory, a local hard-drive, a removable storage unit, an optical disk, a storage device, and/or as a remote server and/or computing cloud (e.g., accessed using a network connection). It is noted that code instructions executable by processor(s) 612 may be stored in data storage device 610, for example, with executing portions loaded into program store 608 for execution by processor(s) 612. Data storage device 610 may store, for example, product model repository 62, hierarchic object (e.g., product) model 610A, and/or the created indexed product dataset 70 (e.g., enhanced indexed object dataset 602A transmitted to search engine 602).

Computing device 606 may include a communication interface 614, optionally a network interface, for connecting to a network 616. Communication interface 614 includes API 608B that provides communication to search engine 602, as describe herein. Communication interface 614 may be implemented as, for example, one or more of, a network interface card, a wireless interface to connect to a wireless network, an internal bus to communicate with other components of a computing device, a software interface to communicate with other processes executing on the computing device, a physical interface for connecting to a cable for network connectivity, a virtual interface implemented in software, network communication software providing higher layers of network connectivity, and/or other implementations.

Exemplary network(s) 616 includes, for example, the internet, a private network, a wireless network, a cellular network, an ad-hoc network, and a virtual network.

Search server 604 may be implemented as, for example, a web server, a network server, a computing cloud, and a virtual server.

Search engine 602 is accessed by one or more client terminals 618 over network 616. Exemplary client terminals 618 include: a server, a computing cloud, a mobile device, a desktop computer, a thin client, a Smartphone, a Tablet computer, a laptop computer, a wearable computer, a glasses computer, and a watch computer. Each client terminal 618 is associated with a display (e.g., touch screen, screen) and/or other device (e.g., microphone, Braille output) that presents the search engine 602 (e.g., GUI, microphone that reads the search results), and includes a mechanism (e.g., keyboard, microphone with speech to text software) for a user to enter the search query. Search engine 602 may be implemented, for example, as an off-the-shelf product (e.g., Elasticsearch, Solr), or custom made.

It is noted that when the search query is provided to the interpretation code (via the API) for analysis (e.g., as text), the user using client terminal 618 does not necessarily need to enter the search query as text, for example, a GUI may be used to convert graphical or menu selections into text, a speech-to-text interface (e.g., code) may be used to generate the text version from spoken words recorded by a microphone, and/or an image entered as the query may be analyzed to interpret what is in the image and used as a search query (e.g., an image of a white table taken by user may be analyzed to generate the search query white table). When the query is entered as an image, the image may be converted into a structured query, optionally the search query.

Search engine 602 searches enhanced indexed product dataset 602A using the received interpreted search query, as described herein. The search results generated by the search engine are presented on client terminal 618, for example, as a list of products on a display, as a message presenting using a messaging application following an interaction with a conversational bot, a text-to-speech interface that reads our the search results, or other implementation. Computing device 606 includes or is in communication with a physical user interface 620 that includes a mechanism for a user to enter data and/or view presented data. Exemplary user interfaces 620 include, for example, one or more of, a touchscreen, a display, a keyboard, a mouse, and voice activated software using speakers and microphone.

The method described with reference to FIG. 4 may be implemented by code executed by a processor(s) of a computing unit, using data received using an API (or other interface, as described herein), for example, over a network from the search server and/or internally from another executing process, or other external server associated with the search engine.

The API described herein receives product-related data, which may include natural language product-related data, and/or other information (e.g., images, codes) for each product defined in a product-related dataset of an e-commerce data source that is searched by the search engine. The product-related data is used to extract features which are later used to enhance an indexed product dataset and/or modeled product representations by the computing device (as described herein). The extracted features are transmitted to the search server (or other storage device associated with the search engine) over the network using the API. As described herein, the search engine transmits the received search query (e.g., received by a user using a client terminal to access the search engine) to the computing device over the network using the API, and receives over the network using the API the interpreted search query used for search for products.

As indicated in block 410, interpretation server 60 may receive product-related data from data source 80. The product-related data may be received by the computing unit using the API.

As indicated in block 420, interpretation server 60 finds by NLA 68 interpretations of terms of the product-related data according to model 100, as described in detail with reference to FIG. 2.

As indicated in block 430, indexing engine 66 stores the term interpretations as a modeled representation of the query input in indexed product dataset 70, i.e. an interpretation indexed according to model 100. One or more interpreted query inputs that relate to the same product may form a modeled product representation in indexed product dataset 70.

Interpretation server 60 may communicate using the API with a search server 90, which receives search queries, obtains from interpretation server 60 their modeled interpretation indexed according to model 100, and finds search results in indexed product dataset 70, by matching the modeled search query interpretation to corresponding modeled product representations stored in indexed product dataset 70.

Figure 5:
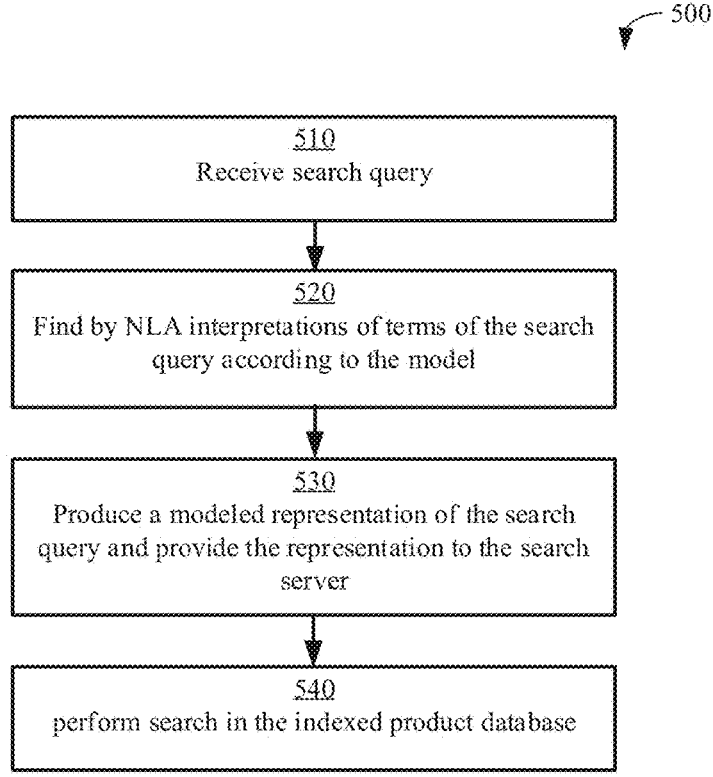
FIG. 5 is a schematic flowchart illustrating a method for interpretation of product-related search queries, according to some embodiments of the present invention.

Further reference is now made to FIG. 5, which is a schematic flowchart illustrating a method 500 for interpretation of product-related search queries, according to some embodiments of the present invention. As indicated in block 510, Interpretation server 60 may receive from search server 90 a search query including at least one term, and may use NLA 68 to find in model 100 stored in product model repository 62 one or more interpretations, i.e. corresponding term appearances, which may include, for example, the same term, a similar term and/or a synonym.

As mentioned with reference to FIG. 2, a term appearance may be a concept, an attribute, or a value. Each term appearance has a location in the model, indicative of related concepts, attributes and/or values.

As indicated in block 520, interpretation server 60 finds by NLA 68 interpretations of terms of the search query according to model 100, as described in detail with reference to FIG. 2. Accordingly, NLA 68 may, for example, detect relations between appearances of the query terms, find high-level-concept appearances and/or other term appearances in model 100, reject inconsistent interpretations and determine term interpretations. The determined modeled interpretation of the search query may be transmitted to search server 90. As indicated in block 530, indexing engine 66 produces a modeled representation of the search query, and provides the modeled representation to search server 90.

As indicated in block 540, search server 90 may perform search in indexed product dataset 70, by detecting modeled product representations that match the modeled representation of the search query. As indicated in block 550, the detected matching product representations may be outputted by search server 90 as search results and/or query terms suggestions.

Optionally, the search server executes code (e.g., which may be downloaded from the computing device (e.g., 606, or another server) that amalgamates multiple different search result ranking considerations into a single search engine query. Exemplary considerations include search result relevance, platform business considerations, and the like. The code executed by the search server may interface with the API of the computing device.

NLA 68 may be configured to filter term interpretations in a pre-defined manner when corresponding pre-defined expressions indicative of relations, thresholds, and/or restrictions are included in the query input. For example, NLA 68 may be configured to perform filtering according to relative expressions such as, for example, less than, more than, between, cheap, large, small, best for, and/or other suitable relative expressions. For example, NLA 68 may be configured to interpret an expression, for example "cheap" or another suitable expression, as a command to filter out all products with a price above a predetermined threshold value.

For example, the threshold value may depend on an identified product category, i.e. a product type concept identified in the query input. Other expressions may be interpreted by NLA 68 as commands to filter out products that don't fit a certain value. In some cases, NLA 68 is instructed by the command to calculate a certain value and/or threshold value based on one or more attributes, and filter out products that don't fit the value and/or the threshold value. Accordingly, NLA 68 may be configured to interpret various relative expressions as respective filtering commands, which may depend on pre-defined thresholds and/or values, and/or on identified concepts, attributes and/or values in the query input.

In some cases, NLA 68 may identify an attribute to which a value in a query input refers, according to a space of possible values of the attributes. For example, NLA 68 may receive a memory capacity value that may refer to a computer RAM or to a computer hard drive. However, NLA 68 may identify that the memory capacity value is included in the value space of the attribute Memory Capacity of the attribute/concept Computer RAM, and excluded from the value space of the attribute Memory Capacity of the attribute/concept Computer Hard Drive, or vice versa. Therefore, NLA 68 may ascribe the memory capacity value to the suitable attribute/concept.

In some embodiments of the present invention, NLA 68 may provide a ranking to the term interpretations. For example, NLA 68 may receive a memory capacity value that may refer to a computer RAM or to a computer solid-state drive (SSD). In case the value is included in both value spaces, NLA 68 may ascribe a higher ranking to the more common interpretation. As described herein, the value spaces may be stored along with a distribution of values, i.e. the extent in which each value is used. Accordingly, NLA 68 may identify in which value space the received memory capacity value is used more frequently, and ascribe a higher ranking to the interpretation that includes the corresponding attribute/concept.

In some cases, NLA 68 may identify an attribute to which a value in a query input refers, according to statistical knowledge implemented in model 100, ascribing customary attributes to concepts. For example, NLA 68 may receive a television size value. Model 100 may define the diagonal length as a main size attribute of a television. A customary attribute of a certain concept may be assigned with a higher score in model 100 then other attributes which are less suitable to the concept. For example, the diagonal length attribute of the television concept is assigned with a higher score than other size attributes such as width.

Therefore, NLA 68 may ascribe the value to a television diagonal length and not, for example, to a width, height, or depth of a television. Accordingly, NLA 68 may filter products according to this value of television diagonal length. In some other embodiments, NLA 68 may ascribe higher ranking to an interpretation that includes a television diagonal length and a lower ranking to an interpretation that includes a width, height, or depth of a television.

In some cases, NLA 68 may identify to which of several possible attributes and/or concepts a query input refers, according to the attributes each of the possible attributes and/or concepts may have. NLA 68 may receive a query input that includes an attribute name, which may be an attribute of only some kinds of possible attributes and/or concepts. Therefore, NLA 68 may filter out the attributes and/or concepts that don't have the named attribute. For example, since only some camera concepts include a prism, a query input that includes the term Prism may cause NLA 68 to filter out attributes and/or concepts that don't have a Prism attribute.

The hierarchic structure of model 100 may facilitate search results and/or interpretations that suit better the user's intention. For example, by interpreting terms according to model 100, NLA 68 may interpret two terms of a search query/query input as a concept and an attribute of the concept, respectively, rather than interpreting the two terms as two stand-alone concepts. For example, NLA 68 may receive a search query or another query input that includes the terms Smartphone and Camera. As described herein, NLA 68 may identify in the query input a high-level concept, i.e. a concept of high hierarchy and/or from which interpretations of other terms inherit or to which interpretations of other terms constitute attributes.

For example, NLA 68 may find that Camera is an attribute of a Smartphone concept, and that Smartphone is not an attribute of a Camera concept. Therefore, NLA 68 may identify Smartphone as a high-level concept and Camera as an attribute of the Smartphone concept. Accordingly, NLA 68 may interpret the query input as Smartphone with Camera. In case the query input further includes the term Sharp, NLA 68 may find in model 100 that Sharp is an attribute of the Camera attribute/concept, and interpret the query input as Smartphone with Sharp Camera.

As described herein, model 100 may include enriched attributes of concepts, i.e. attributes that are calculated based on other attributes and/or calculated based on lack of other attributes (e.g., USB port attribute missing from a laptop) and/or from an image. In case a term in a query input received by NLA 68 has appearance as an enriched attribute, it may restrict the possible interpretations as any other attribute. For example, a Stool concept in model 100 may include a counter height suitability attribute, with values calculated based on a Height attribute. Accordingly, NLA 68 may filter out products with false counter height suitability attribute, in case a query input includes the terms Counter Height Stool and/or synonymous terms. Similarly, NLA 68 may filter out products with false Suitability for Students attribute, in case a query input includes, for example, the terms Laptop for Students and/or synonymous terms.

As described herein, Suitability for Students attribute may be an enriched attribute calculated based on, for example, a Portability attribute and a Price attribute. The portability attribute may be an enriched attribute calculated based on, for example, a Weight attribute, a Size attribute, and/or a Battery Life attribute.

Figure 7A:
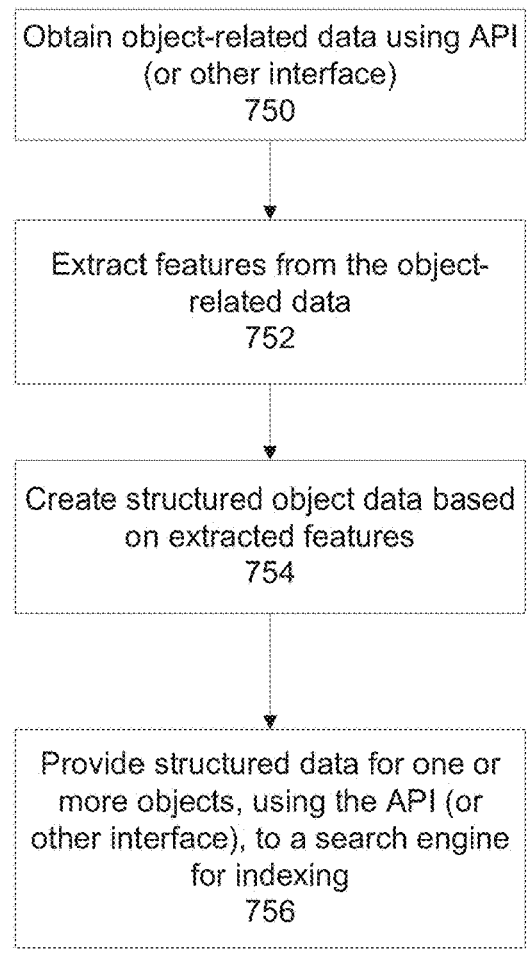
FIG. 7A is a flowchart of a method that extracts features from product-related data received using a software interface from a product server, and provides the extracted features for integration with an existing product-related dataset to create an indexed product dataset in accordance with some embodiments of the present invention.
Figure 7B:
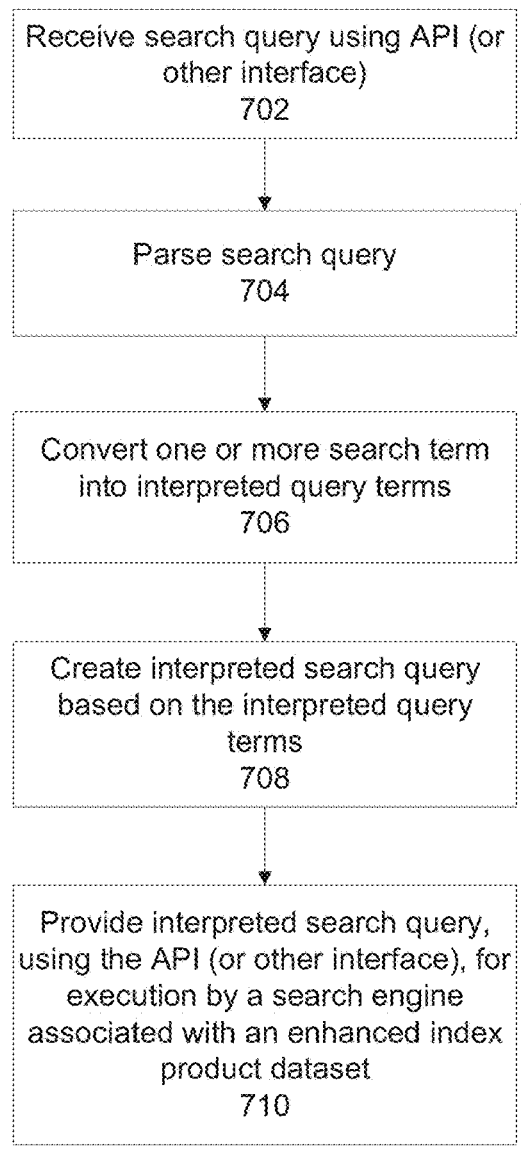
FIG. 7B is a flowchart of a method that converts a search query into an interpreted search query for searching products using a search engine accessing the indexed product dataset, in accordance with some embodiments of the present invention.

Reference is now made to FIG. 7A, which is a flowchart of a method that extracts features from product-related data received using a software interface (e.g., API) from product server 622 and/or from search engine and/or from search server 604, and provides the extracts features for integration with an existing product-related dataset to create indexed product dataset 602A in accordance with some embodiments of the present invention. Reference is also made to FIG. 7B, which is a flowchart of a method that converts a search query into an interpreted search query for searching products using the created enhanced indexed product dataset, in accordance with some embodiments of the present invention. The method described with reference to FIGS. 7A-7B may be executed by the system(s) described with reference to FIGS. 3 and/or 6. The method described with reference to FIG. 7A may include and/or may correspond to one or more acts of the method described with reference to FIG. 4. The method described with reference to FIG. 7B may include and/or may correspond to one or more acts of the method described with reference to FIG. 5.

At 750, product-related data is obtained from product information server(s) 602 by computing device 606 using API 608B (or other software interface), optionally over network 616. Product information server(s) 622 may be associated with (and/or integrated with, and/or equivalent to) search server(s) 604 and/or search engine 602, and/or may include other external and/or remote servers storing data, for example, publicly accessible databases. The product-related data may be obtained by API 608B accessing the product-related data from product information server(s) 602 (and/or other data sources), and/or by product information server(s) 602 transmitting the product-related data to API 608B.

Product-related data is received for multiple products.

The received product-related data may include raw product listings, and/or structured (i.e., formatted) product listings. The product-related data may include the dataset searched by search engine 602, other data from the website of the entity associated with search engine 602, and/or data from external sources that may or may not be associate with search engine 602. The product listing may include one or more of: natural language information of the product, images, videos, content of links associated with the product, user queries, specifications, titles, descriptions, overviews, and reviews.

Other exemplary data includes: product features (e.g., product type such as chair and furniture, product attributes such as color, dimensions, material, possible product uses such as for outdoor use, for kids, for sports, and the like), product metadata (e.g., brand, release date, standard identification codes, manufacturer, model number, and the like), and/or listing features (e.g., price, reviews, shipping destinations, and the like).

Optionally, code associated with the search server organizes the product-related data in accordance with the structure of the indexed product dataset.

At 752, features are extracted from the received product-related data using feature extraction code 608C. The Examples of the extraction of features for each product include attributes of the products and/or other features described herein.

Structured data (also referred to herein as features), may be extracted directly from listing data (and/or other product-related data), and/or inferred. For example, when the product-related data includes the properties "product type=chair" and "color=navy", the extracted features may include the properties "product type=1. chair; 2. furniture", "color=1. navy; 2. blue". The features (which are organized into the structured product data) may be inferred from certain values and/or relationships within the product-related data. For example, the feature "portable=false" may be inferred based on the structured product data lacking any mention of wheels, or the feature "seating capacity=3" may be inferred based on the product-related data describing the width of a sofa falling in a specific range.

At 754, structured data is created for each product using the respective features extracted from the product-related data received for each respective product. The structured data is created by structuring the set of features for each product.

For example, for each product, the structured data may be stored as value of attributes using a suitable data structure, optionally based on the data structure implementing the current indexed data used by the search engine, for example, a table, a graph, a tree, and/or a map.

The structured data may include a product (and/or object) representation of the respective product (and/or object) in accordance with the model (sometimes referred to herein as modeled product representation), as described herein.

At 756, the structured product data of each product for which product-related data was received (at 750) is transmitted, using API 608B, optionally over network 616 (and/or within internal computer busses and/or direct computer-to-computer links and/or other methods) to search server 604 and/or another computing device.

Search server 604 (and/or another computing device and/or the search engine) creates and/or updates enhanced indexed product dataset 602A by integrating the received structured product data with the existing product dataset being searched by search engine 602. Indexed object dataset 602A is made accessible for searching by search engine 602 using the interpreted search queries.

It is noted that the enhanced indexed product dataset may include the original dataset from which the product data was obtained, an external dataset external to the search engine that may be stored locally on a computing device storing the search engine and/or stored remotely on a remote server, a dataset integrated with the search engine (e.g., the dataset currently being used by the search engine prior to enhancement), and/or a previous version of the indexed product dataset that is updated with the new structured object data.

It is noted that the creation and/or updating of enhanced indexed product dataset 602A may be performed by the computing unit, and transmitted using API 608B to search engine 602.

Referring now to FIG. 7B, at 702, a search query is received using the API. The query may be an input text defining a natural language search query, an image, voice converted into a code format, or other implementations.

The search query is provided by a user using a client terminal accessing the search engine, for example, by the user typing the query as text, the user uploading an image used as a query image, the user typing using Braille, and/or the user speaking in to a microphone (or phone). The search query may be received by the search server executing the search engine. The search query defines a search for product(s) by the search engine.

Optionally, at 704, the search query is parsed into search terms, for example, into words where each word is separated by a space. The search terms may be natural language search terms, portions of the image, and/or portions of the recorded audio.

Optionally, the parsing is performed by identifying search terms that match to one or more model elements of the hierarchic object model. For example, for the search query "blue furniture", the term blue and the term furniture are each identified as model elements of the hierarchic object model. An exemplary interpretation is "color should be blue or navy or light blue or dark blue or . . . ", "product type should be furniture or table or chair or sofa or . . . ".

Alternatively or additionally, the parsing may be performed by interpreting the search query based on linguistic rules and/or patterns, which may be stored, for example, as a set-of-rules, code, a look-up table, a mapping database, or other implementations. For example, for the search query smartphone under $1000, the term under may be interpreted as a quantitative inequality intent, which for the described example is based on price (i.e., price <1000). The term under may not necessarily be included in the hierarchic product model. In another example, for the search query cheap smartphone, the term cheap may be interpreted as price <700.

The search terms may be extracted directly from the search query, and/or may be inferred from the search query.

One or more of the search terms may not necessarily correspond to products of the product-related dataset, and/or may not necessarily correspond to parts of products defined by the product-related dataset. The search terms are potentially unmatchable with product(s), for example with free-text based matching, when searched by the search engine without the conversion into the interpreted term described herein. In the case where the search engine finds results for the search terms, the matching results may be irrelevant and/or partial results. For example, the search terms represent attributes and/or concepts that do not correspond to products, and therefore generate an error, bad recall, or irrelevant results when searched by the search engine. For example, the term blue may not necessarily yield results when used by the search engine to perform a standard search, since the color of products may not be a feature defined in the product-dataset. In another example, the term blue may yield results that are not ranked according to the user's intent, such as not ranking by color. The term blue may return only some of the relevant results because only some of the blue products include a feature for blue in a way that is understood to the search engine searching using standard methods (i.e. without the API), for example, in a field called color. Other examples of search terms that may not be found using standard methods include: for students, for babies, lasts a long time, and easy to repair.

It is noted that the search query may include one or more terms that correspond to products and/or parts of products.

Alternatively or additionally, the search query is analyzed in parts or as a whole, without necessarily performing the parsing.

At 706, one or more of the search terms (which may be analyzed in combination with the terms that correspond to products and/or parts of products) are converted into one or more interpreted query terms. It is noted that not all terms are necessarily converted. Some terms may be ignored. Some terms may be interpreted in pairs or groups.

The conversion may be performed based on at least some of synonyms, similar terms, hierarchy, and/or element distance of the model elements of the hierarchic product model that are matched to the search terms. For example the search term notebook may be converted to the synonym laptop. For example, the search term sandals may be converted to the similar term flipflops. For example, the search term blue may be matched to a model element having the following hierarchical terms: blue, navy, light blue, and dark blue. For example, the search term furniture may be matched to a model element having the following hierarchical terms: table, chair, and sofa.

Each interpreted query term is selected to match one or more products when the searching engine searches the indexed product dataset.

Additional details of methods for performing the conversion are described herein, for example, with reference to FIG. 2 and/or FIG. 4. The converting of the search terms may be performed using enriched attributes of products defined by the hierarchic product model. The enriched attribute is calculated based on other attributes (or lack of attribute, e.g., lack of USB port inferred in a computer that does not list USB port as a component) of a concept of the respective product and/or metadata of the respective product. The concept is a model element representing a certain kind of products or parts of products and an attribute is a model element representing properties of the concept, as described herein. Examples of the metadata of the respective product include: image(s), price, text, user information input, specification, title, description, overview, and review.

The enriched attribute is calculated based on at least one formula representing domain expert knowledge of relationships between the attributes of the product, as described herein. For example, the enriched attribute for kids may be computed based on dimensions of furniture that is suitable for kids, and/or made out of materials suitable for kids, and/or user reviews such as "my kids loved it!". For example, the enriched attribute for travelers may be computed based on common dimensions of compartments, such as a luggage compartment, based on rugged materials, and based on reviews, for example, "took this on my trip to Australia!".

The enriched attribute may be dynamically computed during the conversion, and/or pre-computed and stored in association with the product. The enriched attribute may be a Boolean parameter having a value calculated based on the formula. The Boolean parameter may be note a type and/or suitability of the respective product for a certain application and/or certain use. For example, the enriched attribute may denote a true or false value for the Boolean parameters for kids and for travelers.

Each search term may be converted into multiple interpreted query terms, for example, to clarify areas of ambiguity. For example, a keyboard may mean a keyboard of a computer used for typing, or may mean a keyboard used to play music. The meanings of the keyboard may be expressed using synonyms of the keyboard. In another example, search terms may be converted into the multiple interpreted query terms based on weighted similarity and/or entity distance, for example, the search term sandals (optionally with a weight) may be converted into flip flops (optionally with a weight).

Optionally, the conversion is personalized to the user that provided the search query. The conversion may be performed according to a preference for the interpreted query term by the user entering the search query. The user preference may be monitored and/or computed, for example, by code executing on the client terminal of the user and/or on the search engine and/or the search server that recognize the user (e.g., cookie) and record a history of entered search queries and/or a history of user selection. For example, when out of 100 searches based on the term chair, a certain user selects sun chairs 95% of the time, the conversion may be performed accordingly. For example, for the certain user the prototypicality measure (described below in greater detail) of sun chairs may be increased significantly by the search engine. In another example, the term sun chair may be substituted for the term chair when a search query is received from the certain user.

Alternatively or additionally, the conversion is performed according to an analysis of behavior of a cluster of users that share one or more features with the user that provided the search query. The behavior may be learned (e.g., by code instructions) based on an analysis of search behavior of the cluster of users, and/or using a survey to collect data. Exemplary features include age, gender, and geographic location. For example, the learnt behavior is that women over the age of 60 mean simple phone when searching for phone, while every other population means smartphone. The conversion of the search term phone into simple phone or smartphone is performed according to the features of the user.

At 708, an interpreted search query is created based on the at least one interpreted query term. The interpreted search query is created as described herein, for example, as described with reference to FIG. 2 and/or FIG. 4.

It is noted that blocks 706 and 708 may be executed as a single process and/or executed simultaneously.

The interpreted search query is formatted according to a query language of the search engine. For example, Boolean operators may be inserted into the interpreted search query. The formatting in the query language of the search engine may include instructions that are used by the search engine in deciding which results to return, for example, specific results, or compilation with a set-of-rules.

The interpreted search query may be created by encoding the names and/or values of attributes of the interpreted terms, with the operations (e.g., Boolean operators) remaining un-encoded. The operators may be used in the integration of the interpreted search query into the enhanced indexed product dataset.

The interpreted search query may be created based on synonyms of the search term. Multiple terms that are synonyms of one another may be converted to a single (or smaller number of) interpreted term. For example, a search query for laptop or notebook may be converted to one interpreted term, laptop, based on laptop and notebook being synonyms.

The interpreted search query may be created based on entity distance (i.e., weighted similarity), for example, the search term sandal may be used to create the interpreted search query flip flops. The entity distance may be defined using a weight and/or distance that defines the maximum distance (e.g., the degree of correlation) between the terms.

Based on the example above using the search terms color and furniture, an exemplary interpretation (optionally encoded) is "color should be blue or navy or light blue or dark blue or . . . ", "product type should be furniture or table or chair or sofa or . . . ".

Optionally, the interpreted search query is associated with a mapping between each of the search terms and the corresponding converted interpreted query term. The mapping may be stored as, for example, code instructions, points, a mapping matrix, or other data structures stored in association with the interpreted search query. It is noted that the mapping may be used by the search engine (or other code associated with the search engine) to re-format the interpreted search query, rather than interpretation of the original received search query. The mapping may be used, for example, to re-write the interpreted search query (e.g., by the search engine) and/or to provide an interactive user experience (e.g., presenting to the user a breakdown of the search for products using the search query). For example, attributes of products used in the search are marked on the screen. For search for a large briefcase, the mapping may be used by the search engine to highlight the dimensions of the presented returned results. For example, the mapping may be used to remove the terms without wheels from the query chair without wheels. A structured component denoting the absence of wheels may be included, for example, wheels=false. The search may be performed using only the originally received term chair, and/or may be performed based on the structured component denoting the absence of wheels. The removal of terms may be performed in cases where keyword based search with the removed terms have negative impact on the results (e.g., generating results for wheels, or just chairs).

Alternatively or additionally, the interpreted search query is associated with a data-element (e.g., code instructions, other data structure) that is not associated with explicit intent of the user expressed in the search query, which is based on behavioral patterns of the user, statistical computations based on external data, and/or other external data sources.

Alternatively or additionally, the interpreted search query is associated with a data-element (e.g., code instructions, other data structure) defining an extent to which the respective interpreted query term is prototypical denoting a quantitative measure of how much the respective interpreted query term conforms with a definition of a higher-level concept. For example, dining chairs may be considered "more of a chair" than sun chairs. The data-element may instruct the search engine to providing matching dining chairs with a higher ranking than sun chairs, as potential search results to the query term chair. Prototypicality be implemented based on the more that a product appears in the product-dataset, the more prototypical the respective product.

For example, if 80% of chairs in the product-dataset are dining chairs, and only 5% of the chairs are sun chairs, the assigned prototypicality measures instructs the search engine to return results according to the relative percentages. Prototypicality be implemented based on the more that a concept shares properties with some higher level concept, the more prototypical it is considered. For example, the concept dining chair has more shared attributes with the concept chair, instructing the search engine accordingly. Prototypicality be implemented based on the more that a product's attributes are average or common, the more the product is considered prototypical. For example, if the average chair height is 1.5 feet, the search engine is instructed to increase dining chairs' prototypicality compared to sun chairs, since dining chairs are closer to the average chair height than sun chairs.

Alternatively or additionally, the interpreted search query is associated with a data-element (e.g., code instructions, other data structure) defining a negative intent of the respective interpreted query term denoting non-existence of the respective interpreted query term. The interpreted search query may be formatted according to the query language to include an indication of the negative intent of the interpreted query term. For example, the Boolean operator NOT may be used to exclude results matching the interpreted query term. For example, the search query chair without wheels is converted and formatted to clarify to the search engine that the search is for a chair that does not have wheels, rather than searching for both chairs and wheels. The data-element may include instructions for ranking of results by the search engine based on semantic meanings.

For example, using standard methods (i.e. not based on the instructions of the data-element), the search engine may present chairs with wheels as results of the query chairs without wheels, simply because chairs and wheels represent two out of the three words in the query, and without may not be understood by the search engine. The data-element associated with the interpreted search query of chairs without wheels may define instructions that express the fact that without is a negative term, and may be used to by the search engine to assigns higher ranks to results whose data does not include the word wheels.

Alternatively or additionally, the interpreted search query is associated with a data-element (e.g., code instructions, other data structure) defining a distribution based on a value of an attribute associated with the interpreted object. The distribution is based on a value of an attribute, a combination of attributes, a concept, and/or a combination of concepts, for example, product-types, utilizations, and the like. The search engine may be instructed on the extent to which an attribute's value affects boosting based on the distribution. For example, for the search query table $500, the data-element may include a predefined distribution (e.g., Gaussian) for the price attribute of tables (that are potential search results) according to which the tables are to ranked by the search engine. For example, a table with a price of $500 is assigned the highest rank boosting (e.g., a 1.1 factor), another table with a price of $450 is assigned a slightly lower boost (e.g., a 1.08 factor), and yet another table with a price of $400 is assigned an even lower boost (e.g., a 1.02 factor). Boost distributions may be associated with each attribute, and/or associated with values (e.g., the distribution for the search query "table price should be around 500" may be different from the distribution for the search query "table price should be 400").

Alternatively or additionally, the interpreted search query includes instructions for the search engine to attempt to search additional data that is not available to the computing device, for example, not stored in the hierarchical model. For example, prices of products may not be stored in the hierarchical model, however, the interpreted query may include instructions to search according to price, based on the conversion of the search query.

Based on one or more of the described associated elements, the interpreted search query includes instructions for execution by the search engine for matching and ranking modeled product representation defined in an indexed product dataset matching the interpreted search query.

At 710, the interpreted search query is provided using the API, for execution by the search engine. The results of the search (optionally ranked) may be presented to the user on the client terminal, for example, in a GUI. The results may be provided to another process (e.g., executing code) for further processing. For example, to automatically purchase the highest ranked product, read the results to the user (e.g., using a microphone of the client terminal, and/or as a phone call), and/or stored for use in future searches.

Optionally, the search engine executes the interpreted search query by matching the interpreted search query with modeled object representation of each of the products defined in the indexed product dataset. Each of the modeled product representations includes model element(s) and/or hierarchic relations between model elements of the hierarchic object model and/or other representations that may be matched with the interpretation (not necessarily with the hierarchical model). Is it noted that the indexed product dataset stores modeled product representations of the product that may include enhanced attribute(s) of the respective product corresponding to interpreted query terms. The enhanced attributes may not be included in the product-related dataset that would otherwise be searched by the search engine (using standard methods, without the interpreted search query). The search ability of the search engine is thereby enhanced with the ability to search terms.

Examples (which are not necessarily limiting) of search queries and the corresponding interpreted search queries include:

Search query: "black office chair"; interpreted search query: "product type=Office Chair, color=Black".

Search query: "cheap smartphone with camera"; interpreted search query: "product type=Smartphone, price <=$250, Camera exists".

Search query: "iphone 7 new"; interpreted search query: "product type=Smartphone, series=iPhone, model=7, condition=new".

Alternatively (i.e., instead of utilizing the interpreted query as part of the search engine query generation) or additionally, the search engine (and/or another search process) may use the received interpreted search query as a higher level filtering and/or sorting mechanism for a set of results that have already been fetched by the search engine. The first set of results may be fetched by the search engine using the originally entered user query. The search engine may filter and/or sort the results by applying the interpreted search query.

The API (or other interface) may return search engine agnostic interpreted queries (i.e., that are translated to search engine queries by code associated with the search engine), and/or search engine specific interpreted queries (i.e., which are already in the search engine's query language used as is to fetch results, and/or consolidated into a more comprehensive search engine query, as described herein), and/or interpreted queries that may be executed by a family of search engines (e.g., search engines developed using a common development framework, common libraries, and other methods).

Optionally, the computing device includes code executable by the hardware processor for creating the indexed product dataset for use by the search engine to match the interpreted search query with modeled product representations defined in the indexed product dataset. The creation of the indexed product dataset is described herein, for example, with reference to FIG. 4.

Optionally, processor(s) of the search server executes code instructions that incorporate the received interpreted search query with additional search instructions, for example, search result ranking instructions, such as shopper behavioral data (e.g., listing click rates, listing purchase rates, and the like), free text relevance enhancement logic, promotional result boosting, and the like. The code instructions that define handling of the received interpreted search query may be implemented, for example, as additional instructions stored as part of the interpreted search query, and/or as customized code instructions stored by the search server accessible by the search engine that define handling by the certain search engine.

The customized code instructions may define the significance of the interpreted search query according to, for example, each e-commerce platform's preference. The customized code instructions may change over time and/or according to different conditions and/or situations.

The interpreted search query may define the only ranking consideration for the search engine, in which case the search engine may execute the interpreted search query in its current form. The interpreted search query may be one of multiple ranking considerations, in which case the extent to which the interpreted search query affects the search result ranking may be adjusted by the customized code instructions. The interpreted search query may be ignored by the search engine. The interpreted search query may be broken down by the customized code into components. Each component may be assigned a certain weight, such that some components affected the search result ranking more than others.

Optionally, each interpreted query term (e.g., the names and/or values of interpreted term) of the interpreted search query matches one or more products (e.g., names and/or values of the products) of the product-related dataset and/or the indexed product dataset searched by the search engine.

Figure 8:
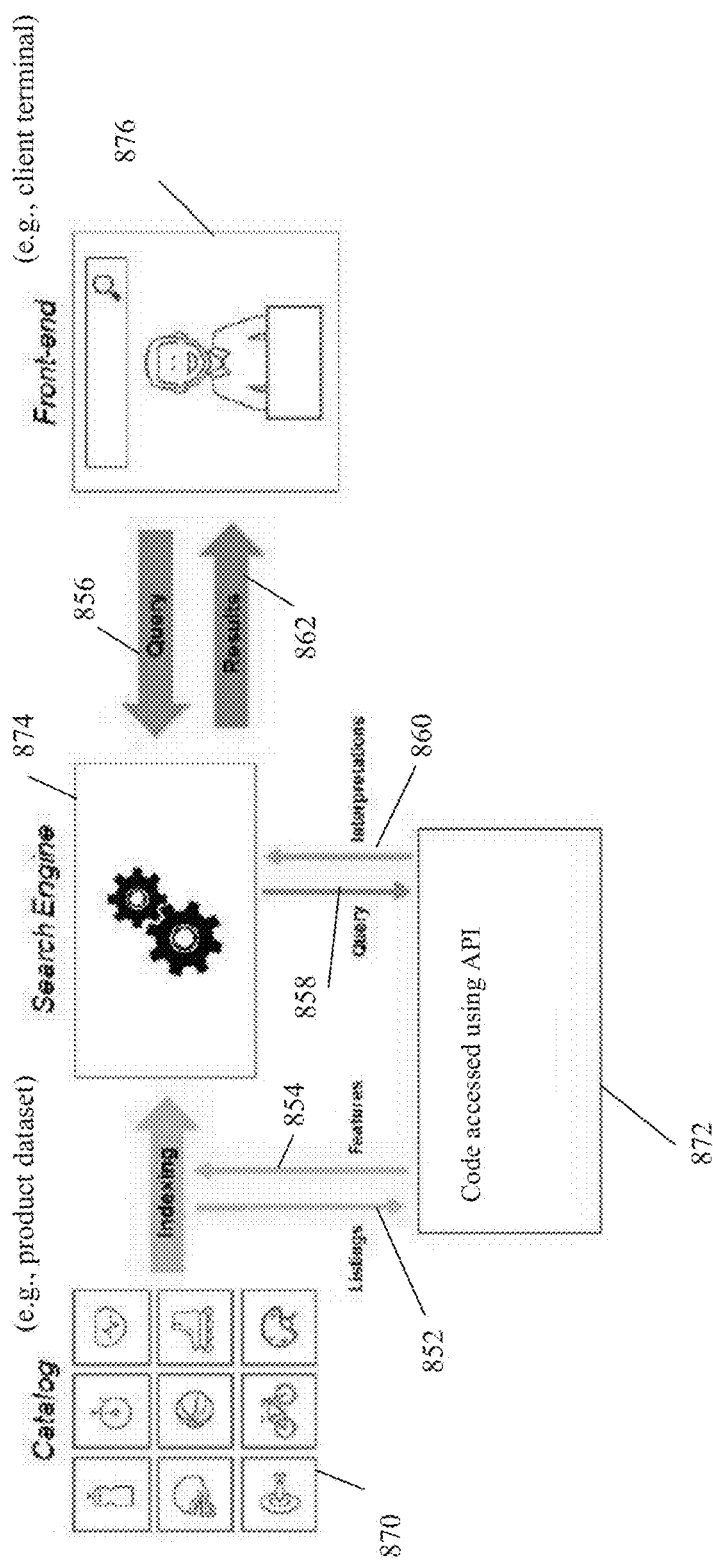
FIG. 8 is a high-level dataflow diagram depicting flow of data for creating an enhanced indexed product dataset, and for converting a search query into an interpreted search query executable by a search engine using the enhanced indexed product dataset, in accordance with some embodiments of the present invention.

Reference is now made to FIG. 8, which is a high-level dataflow diagram depicting flow of data for enhancing with structured features an indexed product dataset, and for converting a search query into an interpreted search query executable by a search engine using the indexed product dataset, in accordance with some embodiments of the present invention.

At 852, catalogue product information (e.g., product-related data) is transmitted from a catalogue 870 (and/or product dataset, and/or object dataset, and/or the index of the search engine itself) to a computing device (e.g., server, code executing on a local computer) using API (or other software interface) 872, which extracts structured features from it. As used herein, the term listings means object-related data of the objects.

At 854, the structured features (also referred to herein as structured object data) are transmitted from the computing device (e.g., server, and/or code executing on a local computer) using API 872 to an indexing process associated with a search engine 874. The indexing process adds the structured features (i.e., structured object data) to the index of search engine 874 together with other information search engine 874 generally indexes in the search engine index to create an enhanced index product dataset.

At 856, a search query entered by a user using a front end device 876 (e.g., client terminal presenting a GUI) is received by search engine 874, and at 858 is transmitted to API 872 for conversion into an interpreted query.

At 860, the interpreted query (also referred to as interpretations) is transmitted from API 872 to search engine 874 for execution using the enhanced indexed product dataset.

At 862, the results obtained from executing the interpreted search query on the enhanced indexed product dataset are provided to the user, optionally to front end device 876 (e.g., for presentation on the GUI presented on the client terminal).

Figure 9:
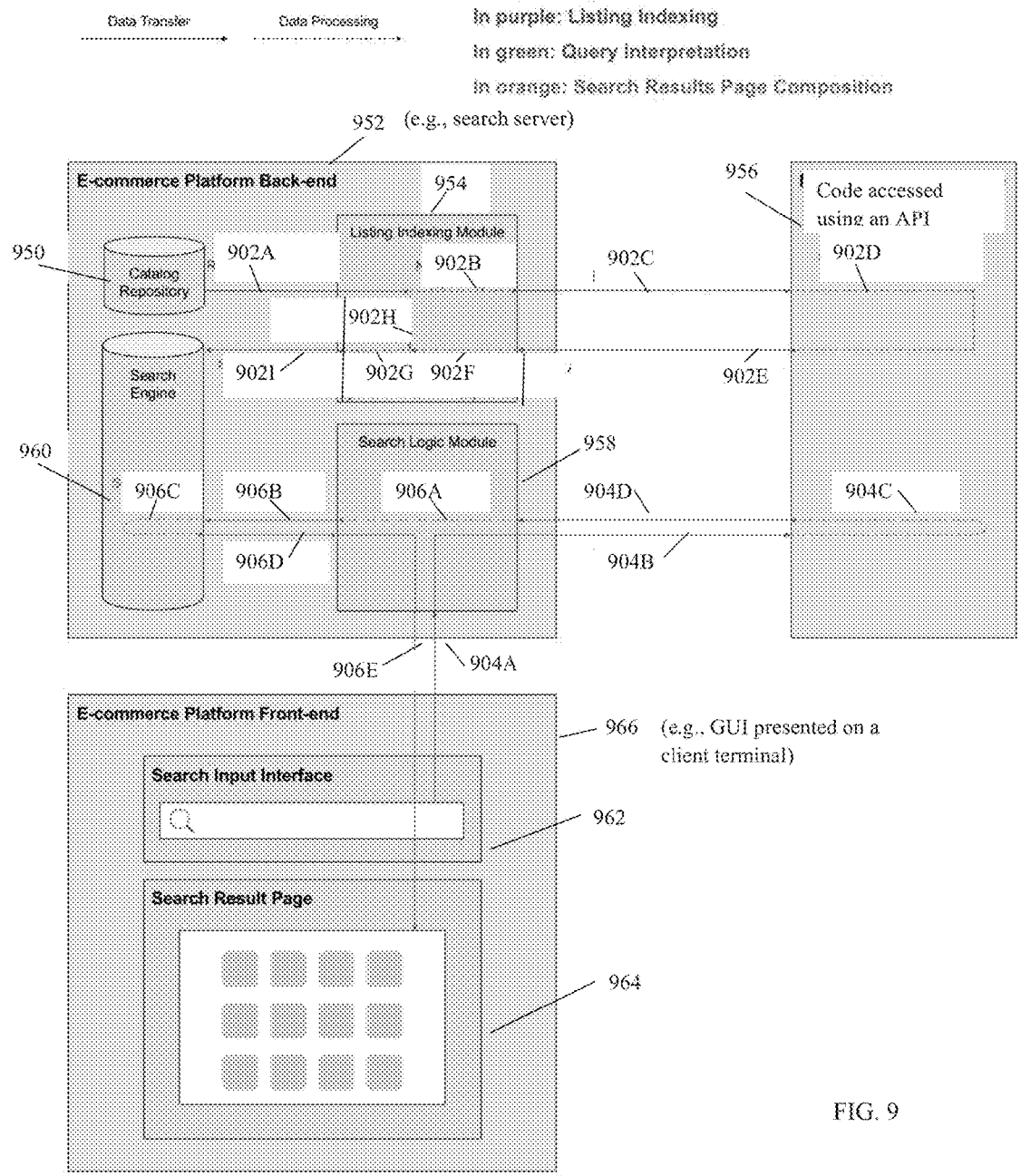
FIG. 9 is a lower-level dataflow diagram depicting flow of data for creating an enhanced indexed product dataset, and for converting a search query into an interpreted search query executable by a search engine using the enhanced indexed product dataset, in accordance with some embodiments of the present invention.

Reference is now made to FIG. 9, which is a lower-dataflow diagram (with reference to FIG. 8) depicting flow of data for creating an enhanced indexed product dataset, and for converting a search query into an interpreted search query executable by a search engine using the enhanced indexed product dataset, in accordance with some embodiments of the present invention. Solid lines denote data transfer. Dotted lines denote data processing.

Three dataflow processes are depicted by the dataflow diagram. The dataflow processes correspond to methods and/or systems described herein. Call out numbers 902A-I denote the dataflow for creating the enhanced indexed product dataset. Call out numbers 904A-D denote the dataflow for converting the search query into the interpreted search query. Call out numbers 906 A-E denote execution of the interpreted search query by the search engine using the enhanced indexed product dataset.

At 902A, product-related data is provided by a catalog repository 950 (and/or product-related dataset and/or object-related dataset, optionally of an e-commerce datasource. As used herein the terms catalog, product-related dataset, and object-related dataset may be interchanged, and may refer to the index of the search engine used as the information source of the products) associated with a search server 952 (also referred to herein as E-commerce Platform Back-end). Catalog repository 950 may be external to search engine 960, may include the enhanced indexed product dataset, and/or may be integrated within search engine, for example, as the indexed dataset currently being searched by search engine 960.

The product-related data defines product elements of each product. The product-related data (which may be natural language information, structured data, free text, and/or non-textual information such as images and/or videos) is provided for objects (e.g., products) stored in catalog repository 950.

At 902B, a listing indexing module (e.g., code instructions executed by processor(s) of search server 952 and/or another server) optionally normalizes the product-related data, for example, processes the product-related data into a format for extraction of features, for example, organizes the product-related data into a define data structure.

At 902C, the product-related data of the products (optionally the normalized information) is transmitted to code 956 executing on a computing device (e.g., a server, code executing on a local computer, optionally including a Natural Language Engine (NLE) for example, corresponding to server 606 and/or NLA 68 and/or interpretation server 60), optionally using an API and/or other software interface (as described herein).

At 902D, code 956 extracts features from the product-related data and computes structured product data using the extracted features for each of the products, as described herein. Briefly, the structured product data maybe created by the following exemplary method: extracting product elements (i.e., feature) from the product-related data, selecting model elements from a hierarchic product model which may include synonyms, image features (e.g., extracted by image processing) and/or similar terms of the product elements (i.e., features) of the product, extracting from the product model hierarchic relations between the model elements, creating a modeled product representation of the respective product by combining: the selected model elements and the hierarchic relations between the model elements, and creating the index product data using the modeled product representation.

At 902E, the structured product data of the products is transmitted to search server 952 (and/or another computing device associated with search engine 960).

At 902F, a listing index module 954 (e.g., code executed by processor(s) may perform additional processing on the structured product data.

At 902G, the structured product data may be combined with the product-related data stored in catalogue repository 950 to create the enhanced indexed product dataset, by converting at 902H the product-related data into a format based on the structured product data. Alternatively or additionally, an existing enhanced indexed product dataset is updated by integration with the received structured product data.

Alternatively or additionally, the structured product data is integrated to create the enhanced indexed product dataset.

At 902I access to the enhanced indexed product dataset is provided to search engine 960.

At 904A, a user uses a search input interface (e.g., GUI, search engine web page presented on a display of a client terminal) 962 to provide an input text and/or image defining a search query for one or more products stored in catalog repository 950.

At 904B, the search query is transmitted to code 956 using the API, optionally by search logic module 958.

At 904C the search query is converted to the interpreted search query by code 956 (as described herein).

At 904D, the interpreted search query is transmitted to server 952, using the API.

At 906A, the interpreted search query may be rewritten by search logic module 958 and/or server 952, for example, based on a set of customized rules, as described herein.

At 906B, the interpreted search query is provided to search engine 960.

At 906C, search engine 960 performs the search using the interpreted search query and the indexed product dataset, and optionally ranks the results based on instructions (e.g., received in association with the interpreted search query, and/or customized instructions).

At 906D, the search results are retrieved.

At 906E, the search results are transmitted to the client terminal of the user and presented in a search result page 964 and/or read to the user (e.g., using a microphone and/or as a phone call) and/or user by another process, and/or re-ranked by other code of the search engine.

Search input interface 962 and search result page 964 may define an E-commerce Platform Front-end 966, for example, a GUI, and/or a web page presented on a display of a client terminal.

Figure 10:
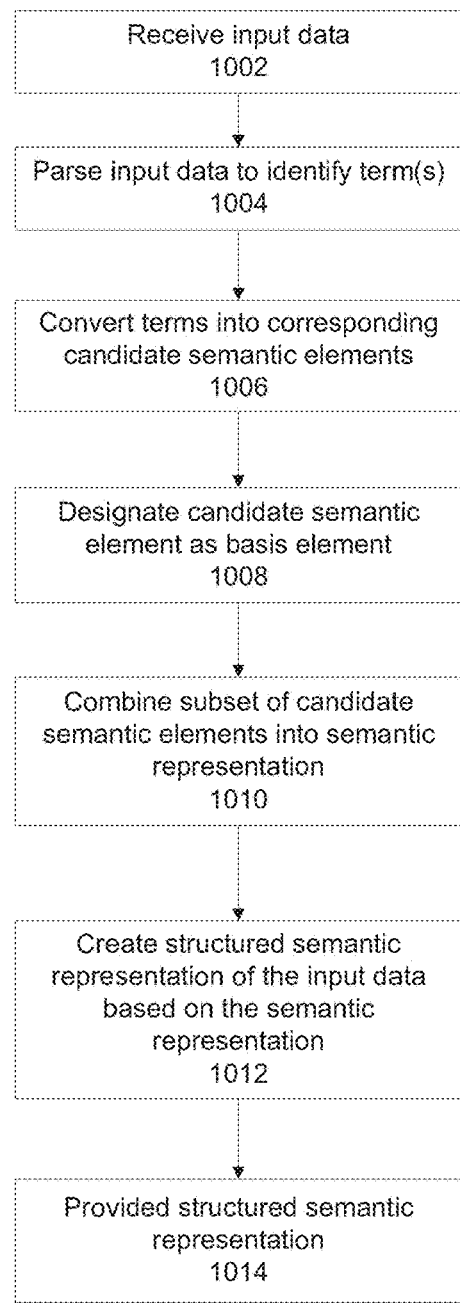
FIG. 10 is a flowchart of a method for converting input data into a semantic representation for creation of structured data for execution by a search engine, in accordance with some embodiments of the present invention.

Reference is now made to FIG. 10, which is a flowchart of a method for converting input data (e.g., search query, object-related data, product description) into a semantic representation for creation of structured data for execution by a search engine, in accordance with some embodiments of the present invention. The method described with reference to FIG. 10 is designed to increase the computational efficiency for identifying the best semantic representation for the input data from a space of possibilities, for example, in terms of reduced processor utilization, reduced processing time, and/or reduced data storage requirements. Conceptually, the method according to FIG. 10 takes a higher level (e.g., eagle's eye) perspective of input data before attempting to completely parse the input data, and efficiently identifying the most likely candidate meanings for the input, which reduces the space for searching for the appropriate semantic representation for the input. Ambiguous terms of the input data are resolved early on, increasing the computational efficiency. In terms of detecting the main object type (e.g., main product type) for object-related data (e.g., product listing) is accurately detected by considering the candidates for the main object type and possible ontological connections with other terms, and selecting the candidate(s) that have the highest probability of providing a correct semantic analysis, with the highest possible coverage of the semantic material in the input, without actually performing a full semantic analysis.

Figure 3:
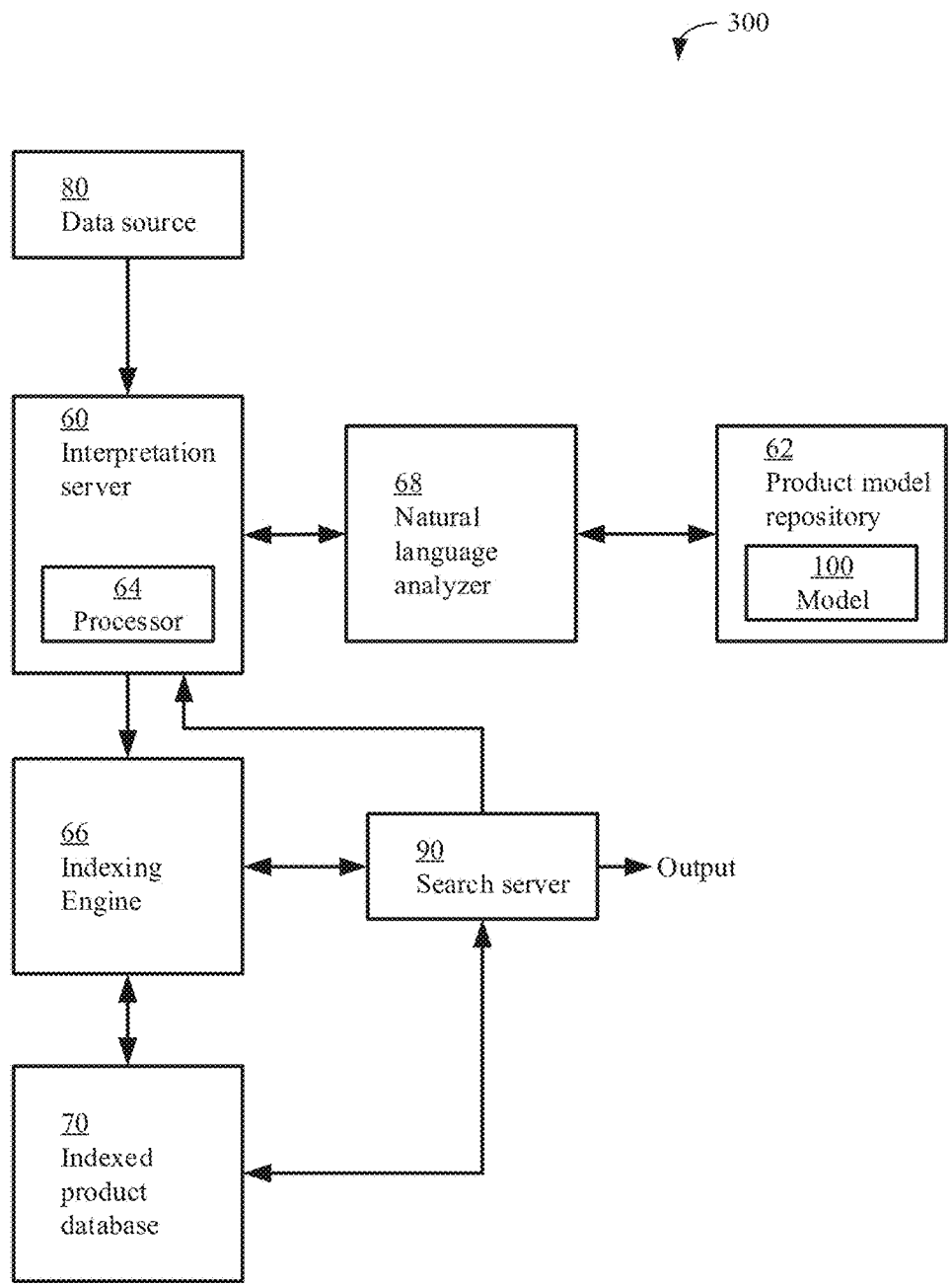
FIG. 3 is a schematic illustration of a system for interpretation of product-related data, according to some embodiments of the present invention.

The method described with reference to FIG. 10 may be executed by the system(s) described with reference to FIGS. 3 and/or 6, optionally by hardware processor(s) 612 of computing device 606 executing semantic representation creation code 608D stored in memory 608 and/or data storage device 610.

Based on computational experiments, inventors estimate that the method described with reference to FIG. 10 accurately identifies the main product type in 95% of product listings, with a reduction in processing time of 75%, in comparison to a naïve method.

Based on the method described with reference to FIG. 10, a computational quick assessment is made of which of the possible Basic Elements has the best potential to be the basis of the best possible semantic representation over the input semantic material. The semantic chart-based method is hence initialized with the best Basic Element and the relevant semantic elements that are ontologically reachable from the Basis Element over the lowest-cost semantic paths. The computation in the chart then proceeds often straightforwardly with no decision points, or with only much fewer than would be the case in the naive implementation of the semantic chart-based method. The remaining decision points may be due to competing possibilities that have the same cost, where larger combination of elements may further differentiate between these possibilities to see which of them is possible in context and has a lower cost.

The method described with reference to FIG. 10 conceptually takes an eagle's-eye perspective of the input text before attempting to completely parse the input, which allows for computationally quick zooming in on the most promising candidate meanings. This, in turn, reduces the search space of the semantic parser considerably in several key ways, including one or more of:

Most (or all) ambiguities are resolved within the preliminary stage, and orthogonal meanings are separated into different sets of Elements, each with its own relevant Basis Element. Effectively, for each processed Basis Element, there are far fewer semantic elements that need to be processed along with the Basis Element in one semantic Chart.

Basis Elements are ranked according to most promising in terms of minimizing the cost function of the final interpretation. Basis Elements derived from implicit inference are inherently penalized by the scoring mechanism, and may therefore be processed as a "last resort". Effectively the number of processed Basis Elements is significantly reduced. In many cases, a single Basis Element is processed instead of for example between 5 to 10 potential elements.

Terms which do not have a relevant meaning in the context of a particular Basis Element are marked as "dead material" (i.e., as there is no ontological path, of any length, between the term and the Basis Element, the path may be defined as having an infinite cost). Hence, these terms and their positions are discarded altogether from the Chart that is based on that Basis Element and the elements that are ontologically reachable from it. Effectively, the number of elements in the Chart becomes smaller even if the original text is long.

At 1002, the input data is received via a software interface (e.g., API 608B), for example, as described with reference to act 702 of FIG. 7B, and/or act 750 of FIG. 7A.

Optionally, the input data includes a search query, for example, as described with reference to act 702 of FIG. 7B. The structured representation created from the semantic representation computed for the search query denotes a structured search query. The structured search query is provided to the search engine for execution by the search engine. The search engine identifies a closest match of one or more modeled objects that are represented and stored in the enhanced indexed object database to the structured representation created from the semantic representation according to the structured search query.

Alternatively, the input data includes object-related data of a certain object, optionally a product listing, for example, as described with reference to act 750 of FIG. 7A. The object-related data may include, for example, the title of the object (e.g., title of the product listing), the specification (e.g., a table of field-value pairs), a free textual description, and the like. The object-related data may be of a physical product, a virtual product, a physical service, and/or a virtual service. The product listing may represent the data available on a product, which may be provided by the vendor of the product.

At 1004, the input data is parsed to identify multiple terms for example, as described with reference to act 704 of FIG. 7B, and/or act 752 of FIG. 7A. It is noted that in some cases, a single term may be identified. The breaking up of the input data, optionally text, into terms may be performed based on tokenization methods.

Optionally, the input data is pre-processed before and/or after identifying the multiple terms. The input data may be processed based on NLP methods described herein. For example, normalizing characters and/or symbols of the input data, regex processing (e.g., detecting various number formats).

At 1006, the terms are converted into corresponding semantic elements (also referred to as candidate semantic elements) for example, as described with reference to act 706 of FIG. 7B, and/or act 752 of FIG. 7A. The semantic elements may be identified by looking up each term in the hierarchical object model 610A. Each semantic element maps to one or more model elements of a corresponding hierarchical object model. The hierarchical object model maps terms (e.g., "accent chair") to one or more model elements (e.g., the product type AccentChair), via for example, the lexicon.

The corresponding semantic elements (which the terms are converted into) represent candidate semantic elements, from which the semantic elements that are combined into the semantic representation structure are selected, as described herein. The selection is optionally performed according to the lowest cost path associated with the selected semantic element in view of the other candidate semantic elements. The selection of the semantic element(s) for combination into the semantic representation conceptually embodies a resolution of ambiguous terms.

Each mapping between a certain term and a corresponding semantic element is associated with a certain weight. Optionally, the weight of an unambiguous term is set at a predefined value, for example, 1, 10, or 100. The weight of an ambiguous term is set to less than the predefined value of an unambiguous term.

The weight associated with each candidate semantic element mapping to the ambiguous term affects the total score (e.g., cost) computed for paths for computing the semantic representation, as described herein.

Optionally, a certain term is converted into multiple semantic elements. It is noted that ambiguous terms are converted into multiple semantic elements based on multiple possible meanings. The multiple semantic elements are considered as candidates. Each respective candidate semantic element is associated with a respective weight indicative of the ambiguity that the certain term actually refers to the corresponding candidate semantic element. One of the multiple candidate elements is selected for inclusion in the semantic representation, resolving the ambiguity, as described herein.

Optionally, each semantic element is associated with an indication of the location of the term relative to the input data. Optionally, the indication is implemented according to a span-index data structure including a pair of indices of the beginning and end term positions relative to the text version of the input data. The span-index is indicative of term(s) of the input data corresponding to the semantic element. For example, the input text "accent chair with tufted back" is analyzed to identify five terms, with indices 0 to 4. For example, the span (2,3) indicates the terms "with tufted".

Each semantic element maps to one or more model elements, and each semantic element may be associated with a span-index. For example, for the input text "dolce and gabbana jeans 70 cm long", the following semantic elements are computed":

A first semantic element for the set of terms "dolce and gabbana", that spans the first three terms of the input text. The terms "dolce and gabbana" are converted into the semantic element that maps to the brand entity model element dolce_and_gabanna in the hierarchical object model.

A second semantic element for the term "and", that spans the second term of the input text. The term "and" is converted into the semantic element that maps to the operator model entity and in the hierarchical object model.

A third semantic element for the term "jeans", that spans the fourth term of the input text. The term "jeans" is converted into the semantic element that maps to the product type model entity Jeans (i.e., a type of clothing) in the hierarchical object model.

A fourth semantic element for the term "jeans", that spans the fourth term of the input text. The term "jeans" is converted into the semantic element that maps to the model entity DenimMaterial (i.e., a type of fabric) in the hierarchical object model.

It is noted that the term "jeans" is ambiguous, being converted into two candidate semantic elements, the third semantic element and the fourth semantic element described above. One of these two candidate semantic elements is eventually selected for inclusion in the semantic representation (as described herein), resolving the ambiguity.

Optionally, multiple consecutive terms of the input data are converted into a single semantic element according to a set of parser rules. The set of parser rules may generate semantic elements based on simple expression patterns. For example, for the input text "dolce and gabbana jeans 70 cm long" described above, a rule for connecting a number and a unit converts the two terms "70" and "cm" to the fifth semantic element mapping to the model element Size{value=70, unit=Centimeter}.

Optionally, a probability is defined for the mapping between a certain term and a corresponding model element (and/or corresponding semantic element). The probability may represent a context-independent probability. The probability may be stored as part of the hierarchical object model, and/or as a separate data structure for example, an array of probability values that include pointers to terms and corresponding model elements. The cost of the path between a certain model element to one of the associated terms may be computed as the inverse of the probability (i.e., the lower the probability the higher the cost). For example, the term "top" may mean a TableTop, a Shirt, a BikiniTop, each with an associated probability. The probability may be computed, for example, based on an analysis of queries of similar terms and corresponding objects (e.g., products) selected by the user for these queries during interaction with the search engine. When a single term or set of terms map to multiple model elements, the candidate semantic element corresponding to the single term or the set of terms is selected according to the model element having the lowest cost (and/or highest probability) path to the single term or set of terms.

Optionally, when the input data includes object-related data (e.g., product listing), the object-related data may include a specification implemented as a table of field-value pairs. A mapping between each input field value of the specification (e.g., in the digital catalog's taxonomy) to a path of attributes in the hierarchical object model may be accessed. The mapping may be stored, for example, as a separate data structure, for example, an array of pointers, and/or as links stored in association with the hierarchical object model. For example, for a digital catalog that includes jewelry with rings, and a ring may include a diamond, the product listing (i.e., object-related data) stored the input field "diamond color" and an associated value "D". When the input field "diamond color" is mapped to the model attribute path JewelryRing.diamond.color in the hierarchical model (e.g., data structure), the otherwise ambiguous term "D" is resolved as referring to the color of the candidate semantic element Diamond that is stored under the main product type model element JewelryRing in the hierarchical object model.

Optionally, when the input data includes object-related data (e.g., product listing), the basis semantic element denoting the main object type (e.g., main product type) is not necessarily computed from the text of the object-related data, but may be provided independently, optionally in advance, for example from an analysis of the title of the object-related data, and/or the source taxonomy category of the product listing and the mapping from that taxonomy to the ontology. The context for the analysis may include the paths of the mapping of the title. The correct meaning for determining the basis semantic element is determined according to this given context, rather than analyzing the different possible meanings of the value and/or title itself. For example, for the value "D", if the context is jewelry, rather than other contexts, then other meanings of "D", are not considered, for example, "D size" of bras, and "D ring" (a tie-down heavy metal ring shaped like the letter D).

Optionally, the converted candidate semantic representation are stored in a chart data structure, or another corresponding data structure implementation. For an input text where the numbers of terms is denoted by N, each sub-span of terms mapping to a certain candidate semantic element is stored by one cell in the chart data structure. For example, spans of length one are (0,0), (1,1), . . . (N−1,N−1). The cells of length one span store candidate semantic elements that are converted from one term. Spans of length two are (0,1), (1,2), etc. store candidate semantic elements that are converted from two terms. Additional cells store increasingly longer number of terms until one cell stores span of size N . . . (0, N−1) representing the candidate semantic element converted from the entire set of terms. Each cell stores zero or more candidate semantic elements over the cell's span.

At 1008, one of the candidate semantic elements is designated as a basis semantic element. The basis semantic element may be set as a root of a tree data structure storing the semantic representation. The basis semantic element stores an object type (e.g., product type) of the semantic representation.

Optionally, multiple candidate semantic elements are considered as candidates for the basis semantic element. The cost of the path from the basis semantic element to each model element corresponding to each candidate semantic element is evaluated. The candidate semantic elements may be ranked according to the path cost. Candidate semantic elements determined from implicit terms have a non-empty path from the implicit term to the inferred object type, and therefore are penalized by a higher path cost, and are ranked lower than candidate semantic elements determined from explicit terms, which have a zero cost (empty path). The basis semantic element is selected from the multiple candidate semantic elements according to the lowest path cost.

When multiple paths exist between the model element corresponding to the basis semantic element and the model elements corresponding to the candidate semantic elements, the paths with lowest cost are considered before paths with higher cost. Computational efficiency of the computing device is improved based on the efficiency and/or fast access to the hierarchical object model to compute the path cost. The path costs may be computed offline a single time and/or stored in memory that is accessed at run-time during analysis of the text input data. The fast and/or efficient access of the hierarchical object model to obtain the path costs provides improved computational efficiency for example, in terms of reduced processing time.

Based on computational experiments, inventors discovered that the ranking of candidate semantic elements according to path cost reduces the number of basis semantic elements that are processed, from about 5-10 potential basis semantic elements to a single basis semantic element.

Optionally, the basis semantic element is determined explicitly according to one or more candidate semantic elements corresponding to one or more terms of the input data. For example, for the input data "blue dell laptop" the basis semantic element of the semantic representation is explicitly found and set according to the candidate semantic element LaptopComputer that corresponds to the term at span (2,2) (i.e., "laptop").

Alternatively or additionally, the basis semantic element is inferred from one or more candidate semantic elements. The basis semantic element is inferred when no terms of the input data directly map to a candidate semantic element that represents an object type according to the hierarchical object model, and/or when none of the explicit candidates for a basis semantic element can support a representation that incorporates enough of the other semantic material found in the input. A candidate semantic element is designated as the basis semantic element when a path exists within the hierarchical object model between the certain candidate semantic element and some object type of the hierarchical object model. For example, for the input data "samsung galaxy s5", the basis semantic element of the semantic representation is designated as the candidate semantic element GalaxySeries, over span (1,1), when a path exists within the hierarchical object model from the model element GalaxySeries to the object type Smartphone. It is noted that none of the terms identified from the input text in the above examples directly map to the object type.

One candidate semantic element is selected over another candidate semantic element when the cost of the path within the hierarchical object model between the candidate semantic element and the object type is less than a cost of another path between the another candidate semantic element and the object type. For example, the candidate semantic element corresponding to the term "galaxy" is selected as the basis semantic element over the candidate semantic element corresponding to the term "samsung" when the cost of the path within the hierarchical model object, from the model element corresponding to GalaxySeries to the object type Smartphone is less than the cost of the path from the model element corresponding to brand Samsung to the object type Smartphone.

One candidate semantic element is designated as an explicit basis semantic element over another candidate semantic element designated as an implicit basis semantic element when the cost of the path within the hierarchical object model between the explicit semantic element and the object type is less than the cost of another path between the implicit semantic element and the object type. For example, the cost of the path from a value model element (e.g., the brand Samsung) through an attribute model element (e.g., Brand) to a product type model element (e.g., Smartphone) has a higher cost than the empty path from a product type model element to itself, for example, when the input text includes the explicit term "smartphone".

It is noted that different types of implicit basis semantic elements may include different costs. For example, inferring a product type candidate semantic element (e.g., Smartphone) from a term denoting a brand, model, or series model element (e.g., "iphone", or "Samsung galaxy") has a lower path cost than inferring a product type candidate semantic element (e.g., DesignProduct) from a term denoting a color or a material (e.g., "red", or "denim"). The differences in costs are due to the path types within the hierarchical object model having different costs.

Optionally, term(s) that are not linked to the basis semantic element may be designated (e.g., tagged, marked, ignored) with an indication of "dead material". When multiple basis semantic elements are considered, the term(s) not linked to each respective basis element are designated with the indication of dead material. There is no path of any length within the hierarchical object model between the term designated as dead material and the respective basis semantic element. Effectively, the path length of terms designated as dead material may be denoted as infinity, or at a cost higher than any possible path cost. The terms designated as dead material are ignored, and/or discarded from further processing, and are excluded from the combination of candidate semantic elements for creation of the semantic representation. Entries in the chart data structure designated as dead material are ignored, and/or discarded. The size and/or number of entries of the chart becomes smaller by discarding and/or ignoring the entries associated with dead material, even when the input text data is long. This minimization of elements in the chart contributes to increased computational efficiency.

It is noted that for brevity and simplicity of explanation, reference is sometimes made to paths between semantic elements, which refer to paths within the hierarchical object model between model elements that correspond to the semantic elements of the input.

For each respective candidate basis semantic element, the costs of the paths from the respective candidate basis semantic element to (optionally all) other candidates semantic elements founds for the input, and the potential coverage of the terms identified for the input text by the semantic elements that are semantically reachable from the respective basis semantic element are considered. The best candidate basis semantic element is selected as the certain candidate basis element that has the highest potential to connect to as many of the other candidate semantic elements while providing the highest coverage of the input text terms (i.e., with the lowest number of skips) and with the lowest cost of semantic paths. The best candidate basis semantic element is selected from the candidate semantic elements according to an estimated total lowest path cost between the model elements corresponding to the candidate semantic elements and the object type of the candidate basis semantic element, and according to an estimated largest number of the terms corresponding to model elements having paths within the hierarchical object model connecting to the model element corresponding to the respective candidate semantic elements (i.e., the coverage of the input).

The best candidate basis semantic element, and the candidate semantic elements semantically reachable from the best candidate basis semantic element, are used to initialize the chart described herein.

When a computation performed according to the chart (e.g., as described in the following paragraphs) yields a worse result than that expected according to the potential of the candidate basis semantic element (e.g., due to additional semantic constraints considered during the chart processing), then the next best candidate basis semantic element is considered for selection as the basis semantic element.

According to the chart data structure initialized with the first candidate basis semantic element and candidate semantic element(s) connected to the first candidate basis semantic element, a total path cost and a corresponding total number of the terms covered by the initialized semantic elements is computed. When the total path cost and the corresponding total number of terms (i.e., coverage of the terms) computed for the best candidate basis semantic element is higher than the estimated lowest path cost and/or lower than the estimated largest number of the covered terms, the chart data structure is initialized with the second best candidate semantic element.

The second best candidate semantic element is selected according to a next ranking of the estimated lowest path cost and the estimated largest number of the covered terms. It is noted that in practice, in most cases, the first candidate basis semantic element (or second ranking candidate basis semantic elements) is selected as the basis semantic element, yielding the best result, which avoids wasted computational effort in the chart phase, thus leading to overall improved computational efficiency.

The chart may be initialized with the selected basis semantic element and the candidate semantic element(s) that have corresponding model elements with lowest cost paths connections to the model element corresponding to the basis semantic element.

Thanks to the initialization of the chart with one basis semantic element (and not all candidates), and with semantic material that is relevant (i.e., semantically reachable) to the basis semantic element, computational efficiency of the computing device may be obtained based on the combination of the candidate semantic elements performed with no decision points, or with fewer decision points than would otherwise occur in the naïve implementation described herein, which reduces total computational processing resource utilization and/or processing time.

Optionally, when the input data includes object-related data (e.g., product listing), the set of semantic elements being analyzed for designation as the basis semantic element is reduced according to the taxonomy of the object-related data, for example, the catalog taxonomy of the product listing. Semantic elements mapping to model elements that are associated with the taxonomy of the object-related data are evaluated for designation as the basis semantic elements. Other semantic elements that map to model elements that are not associated with the taxonomy of the object-related data are ignored and/or otherwise not considered for designation as the basis semantic element.

For example, the title of a product listing includes the word "keyboard", which is generally ambiguous, since keyboard may refer to a computer keyboard or a musical keyboard. When the product listing is associated with a catalog of computer accessories, then semantic elements associated with computer keyboard are considered, and semantic elements associated with musical keyboard are ignored and/or not evaluated, as the semantic elements are not linked by the mapping from the input computer taxonomy to the ontology.

At 1010, a subset of the candidate semantic elements are combined into the semantic representation. Note the subset may include all of the candidate semantic elements, or less than all of the candidate semantic elements. The subset of the candidate semantic elements are combined according to a path requirement between each of the model elements of the hierarchical object model corresponding to each of the subset of candidate semantic elements, and the object type of the hierarchical object model corresponding to the basis semantic element. Exemplary path requirements include: a lowest cost, and/or a maximization of weights, associated to the path between each model element corresponding to each candidate semantic element, and the object type corresponding to the basis semantic element.

Optionally, multiple combinations of subsets of candidate semantic elements are created. The multiple combinations may be stored in a suitable data structure, for example, the chart.

The chart data structure is populated with the candidate semantic elements converted from the terms, as described with reference to act 1006. Larger candidate semantic elements (i.e., sub-combinations) are constructed from smaller candidate semantic elements according to combination rules. The sub-combinations of relatively larger candidate semantic elements may be created iteratively, by combining sub-combinations of the smaller candidate semantic elements. The sub-combinations are performed according to the smaller candidate semantic elements having lower path costs. When two semantic elements have the same path cost (or similar path cost within a tolerance range), multiple sub-combinations of larger semantic elements may be created, where by adding another candidate semantic element with another path cost, one of the larger sub-combinations is selected according to the lower total path cost.

Optionally, the chart (and/or other data structure) stores a cost of a path between member candidate semantic elements of each combination. Each smaller candidate semantic elements, and/or sub-combination of smaller candidate semantic elements (i.e., the larger candidate semantic elements) is associated with the cost. The cost may be computed according to the path costs between the member candidate semantic elements, for example, a sum of individual paths between each pair of members.

Optionally, lower cost candidate semantic elements (e.g., sub-combinations, relatively loner candidate semantic elements) are selected for combination into relatively larger candidate semantic elements and/or for combination into the semantic representation according to the lowest path costs. Candidate semantic elements having lower path costs are selected for combination over candidate semantic elements having relatively higher path costs. When a certain selected candidate semantic element cannot be included in the combination (e.g., no path exists to another selected candidate semantic element), the candidate semantic element with the next path cost above the lowest path cost is selected for inclusion in the combination. Candidate semantic elements with lower path cost are selected before candidate semantic elements with higher path cost.

Conceptually, the path cost represents the potential of the model elements and the paths between the model elements to yield a semantic representation that has the lowest cost and the highest coverage of the semantic material in the input data.

It is noted that other data structures may be implemented, for example, an array data structure that maps between candidate semantic elements and locations of the terms within the input text.

Optionally, the combination rule defines combining the basis semantic element (denoting object type, for example, a type of product, or a product component) with a candidate semantic element when a path exists within the hierarchical object model, between the model element corresponding to the candidate semantic element and the object type of the hierarchical object model corresponding to the basis semantic element. The candidate semantic element may be of any type, for example, representing a number, size of object, attribute, attribute value, and the like. For example, for the basis semantic element (i.e., object type) Camera, and a candidate semantic element corresponding to the brand model element panasonic, the hierarchical object model defines two possible semantic connections (i.e., paths). The first semantic connection links the candidate semantic element panasonic to the brand of the body of the basis semantic element Camera. The second semantic connection links the candidate semantic element panasonic to the brand of the lens of the basis semantic element Camera. Two longer candidate semantic elements are created. The first longer candidate semantic element is stored as a structure representing Camera with body.brand=panasonic. The second longer candidate semantic element is stored as a structure representing Camera with lens.brand=panasonic.

Optionally, the candidate semantic elements are iteratively combined. Relatively shorter candidate semantic representations are iteratively combined into relatively longer semantic representations according to a lowest cost associated with the respective paths between model elements of the hierarchical object model corresponding to the shorter candidate semantic representation. For example, referring to the example in the previous paragraph, the total cost of the path within the hierarchical data structure of the model elements corresponding to the first longer candidate semantic element is lower than the total cost of the path within the hierarchical data structure of the model elements corresponding to the second longer candidate semantic element, because the path costs are defined in this way in the ontology. Therefore, the first longer candidate semantic element is created and/or stored and/or further processed in a next iteration to create yet a longer candidate semantic element, until the semantic representation is created.

The costs of the paths between model elements of the hierarchical object model may be stored, for example, within the hierarchical object model, and/or in an external data structure, for example, an array of cost values that maps to links between model elements. Costs may define, for example, that a path from one model element (corresponding to a semantic element) for example, Table, through an attribute (corresponding to another semantic element) for example, Color, to yet another model element (corresponding to yet another semantic element) for example, Blue, has a cost of 1 or other values. Other paths may be associated with different costs.

When one or more terms correspond to multiple candidate semantic elements (i.e., the term is ambiguous) multiple combinations of candidate semantic elements may be created. The candidate semantic elements may be combined according to the lowest path cost within the hierarchical object model between the different model elements that correspond to the same term. For example, for the input text (e.g., search query) "gold watch", the term "gold" is ambiguous, since "gold" may refer to a color or to a material. The hierarchical object model defines a path that connects the model element WristWatch through the model element attribute Color to the model element GoldColor as having a higher cost than another path that connects the model element WristWatch through the model element attribute Material to the model element GoldMaterial. Selecting the path having the lower cost is indicative that the term "gold" is more likely to refer to the watch's material than to the watch's color.

When the second longer candidate semantic element has a lower path cost than the first longer candidate semantic element, the first longer semantic element is further combined with another candidate semantic element when no path exists between the second longer semantic element and the another candidate semantic element, and/or when the new total path cost of the second longer semantic element combined with the another candidate semantic element is longer than the new total path cost of the first longer semantic element combined with the another candidate semantic element. Conceptually, a backtracking is performed to the candidate semantic element with the next best (e.g., lowest) cost when the candidate semantic element with the lowest cost cannot be further combined and/or leads to a higher cost.

When no possible path is found between two candidate semantic elements (e.g., two shorter candidate semantic elements being combined into the longer semantic element) the two candidate semantic elements are not combined. The no possible path may be mathematically denoted as having an infinite cost, a cost value higher than the cost possible to assigned to existing paths, and/or using a predefined notation.

Optionally, the subset of candidate semantic elements is combined according to another semantic combination rule that creates a link between one candidate semantic element indicative of an attribute and another candidate semantic element storing a value defined as appropriate for the attribute according to the type of the attribute. The term(s) corresponding to the candidate semantic element indicative of the attribute and the term(s) corresponding to the candidate semantic element storing the value are located adjacent to one another within the terms identified for the input data. The subset of candidate semantic elements created by linking the one candidate semantic element indicative of the attribute with the other candidate semantic element storing the value may be further combined with other semantic elements.

For example, referring back to the example of the input text "Dolce and Gabbana jeans 70 cm long", the following iterations create relatively longer candidate semantic elements from relatively shorter candidate semantic elements:

For the terms "70 cm long", a longer candidate semantic element is created by combining the shorter candidate semantic element attribute Length and the shorter candidate semantic value Size(70, cm).

For the terms "jeans 70 cm long", a longer candidate semantic element is created by combining the shorter candidate semantic element product type Jeans with the shorter candidate semantic element attribute Length and the shorter candidate semantic element value Size (70, cm).

For the terms "Dolce and Gabbana jeans 70 cm long", a longer candidate semantic element is created by combining the created shorter candidate semantic element product type Jeans and attribute Length of Size(70,cm) with the shorter candidate semantic element Brand value dolce_and_gabbana.

Optionally, the longer candidate semantic elements are created by iteratively combining shorter candidate semantic elements, while skipping one or more terms. For example, without skipping and/or ignoring terms, the candidate semantic element that corresponds to the term that ends at span index position 2 may be combined with the candidate semantic element that corresponds to the term that starts at span index position 3. When the candidate semantic element that corresponds to the term that starts at span index position 3 is ignored, the candidate semantic element that corresponds to the term that ends at span index position 2 may be combined with the candidate semantic element that corresponds to the term that starts at span index position 4, effectively skipping position 3. When the candidate semantic element(s) that corresponds to the term(s) that starts at span index position 3 and 4 are ignored, the candidate semantic element that corresponds to the term that ends at span index position 2 may be combined with the candidate semantic element that corresponds to the term that starts at span index position 5, effectively skipping positions 3 and 4.

Optionally, the subset of the candidate semantic elements that are combined into the semantic representation correspond to distinct terms of the input data. No two candidate semantic elements of the subset, which may be created from shorter semantic elements, correspond to the same term of the input text. Optionally, the branches of the semantic representation includes semantic elements that correspond to distinct terms of the input text. The distinct terms of the input text do not overlap one another.

The subset of the candidate semantic elements that are combined into the semantic representation respects a span exclusiveness constraint when no two members of the subset reside over spans that overlap with each other. Each term identified from the input data maps to a single candidate semantic element which is combined into the subset to generate the semantic representation.

The semantic representation may be stored in a tree data structure and/or a graph data structure, where the root includes the basis semantic element.

For example, the semantic representation for the input text (e.g., search query) "table with green glass top" includes the following four semantic elements, which map to corresponding model elements of the hierarchical object model: TableFurniture, GreenColor, GlassMaterial, TableTop. The paths between the model elements according to the hierarchical object model are:

Table→top_component→TableTop
Table→top_component→TableTop→color→GreenColor
Table→top_component→TableTop→material→GlassMaterial At 1012, a structured representation of the input data is created based on the semantic representation for example, as described with reference to act 708 of FIG. 7B, and/or act 754 of FIG. 7A Optionally, when the input data includes a search query, the structured representation created from the semantic representation computed for the search query denotes a structured search query, for example, as described with reference to act 708 of FIG. 7B.

Alternatively, when the input data includes object-related data, optionally product-related data, the structured representation created from the semantic representation computed for the object-related data is structured for integration within an existing object dataset searchable by the search engine, for example, as described with reference to act 754 of FIG. 7A.

At 1014, the structured representation is provided, via the software interface, for execution by the search engine for example, as described with reference to act 710 of FIG. 7B, and/or act 756 of FIG. 7A.

Optionally, when the input data includes a search query, the structured search query is provided to the search engine for execution by the search engine, for example, as described with reference to act 710 of FIG. 7B. The search engine identifies a closest match of one or more modeled object represented stored in the enhanced indexed object data to the structured representation created from the semantic representation according to the structured search query.

Alternatively, when the input data includes object-related data, optionally product-related data, the structured representation created from the semantic representation is indexed within the existing object dataset searchable by the search engine, for example, as described with reference to act 756 of FIG. 7A.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment.

Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for converting input data into a semantic representation for creation of structured data for execution by a search engine, comprising:
    a non-transitory memory having stored thereon a code for execution by at least one hardware processor of a computing device, the code comprising:
        code for receiving input data via a software interface;
        code for parsing the input data to identify a plurality of terms;
        code for converting the plurality of terms into a corresponding plurality of candidate semantic elements, wherein each candidate semantic element maps to at least one model element of a hierarchical object model, wherein paths between model elements of the hierarchical object model are associated with respective costs;
        code for designating one of the plurality of candidate semantic elements as a basis semantic element indicative of an object type, wherein the basis semantic representation is set as a root of a tree data structure representation of the semantic representation;
        code for selecting a subset of the plurality of candidate semantic elements according to a lowest path cost between each of the model elements of the hierarchical object model corresponding to each of the subset of the plurality of candidate semantic elements and the object type of the hierarchical object model corresponding to the basis semantic element;
        code for creating a semantic representation based on a combination of the selected subset of the plurality of candidate semantic elements, wherein the semantic representation comprises a hierarchical structure of the subset of the plurality of candidate semantic elements connected to the basis semantic element by semantic relations;
        code for creating a structured representation of the input data based on the semantic representation; and
        code for providing the structured representation, via the software interface, for execution by the search engine;
        wherein the path cost is computed according to an inverse of a context-independent probability between a mapping of respective candidate semantic elements and corresponding model elements of the hierarchical object model.

2. A computer program product for converting input data into a semantic representation for creation of structured data for execution by a search engine, comprising:
    a non-transitory memory having stored thereon a code for execution by at least one hardware processor of a computing device, the code comprising:
        instructions for receiving input data via a software interface;
        instructions for parsing the input data to identify a plurality of terms;
        instructions for converting the plurality of terms into a corresponding plurality of candidate semantic elements, wherein each candidate semantic element maps to at least one model element of a hierarchical object model, wherein paths between model elements of the hierarchical object model are associated with respective costs;

instructions for designating one of the plurality of candidate semantic elements as a basis semantic element indicative of an object type, wherein the basis semantic representation is set as a root of a tree data structure representation of the semantic representation;

instructions for selecting a subset of the plurality of candidate semantic elements according to a lowest path cost between each of the model elements of the hierarchical object model corresponding to each of the subset of the plurality of candidate semantic elements and the object type of the hierarchical object model corresponding to the basis semantic element;

instructions for creating a semantic representation based on a combination of the selected subset of the plurality of candidate semantic elements, wherein the semantic representation comprises a hierarchical structure of the subset of the plurality of candidate semantic elements connected to the basis semantic element by semantic relations;

instructions for creating a structured representation of the input data based on the semantic representation; and instructions for providing the structured representation, via the software interface, for execution by the search engine;

wherein the path cost is computed according to an inverse of a context-independent probability between a mapping of respective candidate semantic elements and corresponding model elements of the hierarchical object model.

3. A method for converting input data into a semantic representation for creation of structured data for execution by a search engine, comprising:

receiving input data via a software interface;

parsing the input data to identify a plurality of terms;

converting the plurality of terms into a corresponding plurality of candidate semantic elements, wherein each candidate semantic element maps to at least one model element of a hierarchical object model, wherein paths between model elements of the hierarchical object model are associated with respective costs;

designating one of the plurality of candidate semantic elements as a basis semantic element indicative of an object type, wherein the basis semantic representation is set as a root of a tree data structure representation of the semantic representation;

selecting a subset of the plurality of candidate semantic elements according to a lowest path cost between each of the model elements of the hierarchical object model corresponding to each of the subset of the plurality of candidate semantic elements and the object type of the hierarchical object model corresponding to the basis semantic element;

creating a semantic representation based on a combination of the selected subset of the plurality of candidate semantic elements, wherein the semantic representation comprises a hierarchical structure of the subset of the plurality of candidate semantic elements connected to the basis semantic element by semantic relations;

creating a structured representation of the input data based on the semantic representation; and providing the structured representation, via the software interface, for execution by the search engine, wherein the path cost is computed according to an inverse of a context-independent probability between a mapping of respective candidate semantic elements and corresponding model elements of the hierarchical object model.

4. The method according to claim 3, wherein when a certain term of the plurality of terms corresponds to a plurality of candidate semantic elements, the subset of the plurality of candidate semantic elements are combined into the semantic representation according to a lowest cost path within the hierarchical object model of a plurality of model elements corresponding to the plurality of candidate semantic elements, wherein the lowest cost path is indicative of one of the plurality of terms that correspond to the certain term.

5. The method according to claim 3, wherein a data structure stores sub-combinations of the plurality of candidate semantic elements, each respective sub-combination associated with a cost of a path between candidate semantic elements of the sub-combination; wherein sub-combinations are selected from the data structure for combination into the semantic representation according to a lowest ranking of the cost of the path.

6. The method according to claim 3, wherein the input data comprises a search query, and the structured representation of the semantic representation of the search query comprises an interpreted search query for execution by the search engine by matching the interpreted search query with at least one modeled object representations stored in an enhanced indexed object dataset, wherein the enhanced indexed object dataset is created by creating a structured object representation for each respective object of an object dataset, by extracting features from the respective object of the object dataset, selecting model elements from the hierarchic object model based on the extracted features, extracting hierarchic relations between the selected model elements, and combining the selected model elements and hierarchic relations between the selected model elements.

7. The method according to claim 3, wherein the input data comprises product-related data of a certain product, and the semantic representation is integrated within an existing object dataset searchable by the search engine.

8. The method according to claim 3, wherein the converting between each term and corresponding candidate semantic element is associated with a certain weight indicative of the ambiguity that the term actually refers to the corresponding candidate semantic element.

9. The method according to claim 3, wherein each respective candidate semantic element is associated with a span-index indicative of at least one term of the input data corresponding to the respective semantic element.

10. The method according to claim 9, wherein a same span-index value of an ambiguous term maps to a plurality of candidate semantic elements.

11. The method according to claim 3, wherein a plurality of terms of the input data are converted into a single candidate semantic element according to a set of parser rules.

12. The method according to claim 3, wherein subsets of the plurality of candidate semantic element are stored in a chart data structure, wherein each cell of the chart data structure stores increasingly larger combinations of candidate semantic elements, wherein initially each of the plurality of candidate semantic elements are stored in cells of the chart data structure corresponding to a span-index of the terms from which the respective candidate semantic elements were converted, and larger combinations of the plurality of candidate semantic elements are constructed from smaller plurality of candidate semantic elements according to combination rules and stored in cells of the chart data structure corresponding to the location of the plurality of terms that correspond to the larger combinations of the plurality of candidate semantic elements.

13. The method according to claim 12, wherein the chart data structure is initialized according to a first candidate basis semantic element and at least one candidate semantic element of the plurality of candidate semantic elements connected to the first candidate basis semantic element according to paths of the hierarchical object model connecting the model element corresponding to the first candidate basis semantic element and the at least one model element corresponding to the at least one candidate semantic element of the plurality of candidate semantic elements connected to the first candidate basis semantic element.

14. The method according to claim 13, wherein the first candidate basis semantic element is selected from the plurality of candidate semantic elements according to an estimated total lowest path cost between the model elements corresponding to the plurality of candidate semantic elements and the object type of the first candidate basis semantic element, and according to an estimated largest number of the plurality of terms corresponding to model elements having paths within the hierarchical object model connecting to the model element corresponding to the one of the plurality of candidate semantic elements, wherein the first candidate basis semantic element is set according to the one of the plurality of candidate semantic elements.

15. The method according to claim 14, further comprising, computing according to the chart data structure initialized with the first candidate basis semantic element and the at least one candidate semantic element of the plurality of candidate semantic elements connected to the first candidate basis semantic element, a total path cost and a corresponding total number of the plurality of terms, and initializing the chart data structure with a second candidate basis semantic element when the total path cost and the corresponding total number of the plurality of terms computed for the first candidate basis semantic element is higher than the estimated lowest path cost and/or lower than the estimated largest number of the plurality of terms, wherein the second candidate semantic element is selected according to a next ranking of an estimated lowest path cost and an estimated largest number of the plurality of terms computed for the second candidate semantic element.

16. The method according to claim 3, further comprising designating the basis semantic element from the plurality of candidate semantic elements according to a lowest path cost between the model element corresponding to one of the plurality of candidate semantic elements and the object type of the hierarchical object model, wherein the basis semantic element is set according to the one of the plurality of candidate semantic elements.

17. The method according to claim 16, wherein a first longer candidate semantic element having a path cost that is higher than a second longer candidate semantic element is further iteratively combined with another candidate semantic element when no path exists between the second longer candidate semantic element and the another candidate semantic element.

18. The method according to claim 3, further comprising designating at least one term of the plurality of terms as dead material when no path exists within the hierarchical data structure between at least one model element corresponding to the at least one term and the basis semantic element, wherein the at least one candidate semantic element corresponding to the at least one model element corresponding to the at least one term designated as dead material is excluded from combination to create the semantic representation.

19. The method according to claim 3, wherein the combination is created according to a first semantic combination rule that creates a candidate semantic representation by combining the basis semantic element with another candidate semantic element when a path exists within the hierarchical object model, between the model element corresponding to the another candidate semantic element and the object type of the hierarchical object model corresponding to the basis semantic element.

20. The method according to claim 3, wherein the combination is created iteratively, by combining shorter candidate semantic representations into longer semantic representations according to a lowest cost associated with the respective paths between model elements of the hierarchical object model corresponding to the shorter candidate semantic representation.

21. The method according to claim 3, wherein the combination is performed according to a second semantic combination rule that creates a link between a first candidate semantic element indicative of an attribute and a second candidate semantic element storing a value defined as appropriate for the attribute of the first candidate semantic element, wherein at least one term of the input data corresponding to the second semantic element is located within the input data adjacent to at least one term corresponding to the first semantic element.

22. The method according to claim 3, wherein the subset of the plurality of candidate semantic elements combined into the semantic representation correspond to distinct terms of the input data, such that no two candidate semantic elements of the subset of the plurality of candidate semantic elements correspond to the same term of the plurality of terms.

23. The method according to claim 3, wherein shorter candidate semantic elements are iteratively combined to create longer candidate semantic element by ignoring candidate semantic elements mapped to permutations of at least one term of the plurality of terms.

24. The method according to claim 3, wherein the basis semantic element stores an object type of the semantic representation.

25. The method according to claim 3, wherein a certain candidate semantic element of the plurality of candidate semantic representations is designated as the basis semantic element when a path exists within the hierarchical object model between the certain candidate semantic element and the object type of the hierarchical object model.

26. The method according to claim 25, wherein the certain candidate semantic element is selected over another candidate semantic element when the cost of the path within the hierarchical object model between the certain candidate semantic element and the object type is less than a cost of another path between the another candidate semantic element and the object type.

27. The method according to claim 3, wherein for a certain term of the plurality of terms that corresponds to a plurality of model elements, a candidate semantic element corresponding to the certain term is selected according to a highest probability of a path between the certain term and a model element of the plurality of model elements corresponding to the candidate semantic element.

28. The method according to claim 3, wherein a first candidate semantic element and a second candidate semantic element are not combined when no path is found within the hierarchical object model between a first model element corresponding to the first candidate semantic element and a second model element corresponding to the second candidate semantic element.

29. The method according to claim 3, wherein the subset of the plurality of candidate semantic elements are selected to cover a largest number of the plurality of terms of the input data at a total lowest cost of the path cost between the model elements of the hierarchical object model corresponding to each of the subset of the plurality of candidate semantic elements and the object type of the hierarchical object model corresponding to the basis semantic element.

30. The method according to claim 3, wherein the respective costs of paths between model elements of the hierarchical object model are computed offline a single time and stored in a memory that is accessed at run-time during the converting of the input data into the semantic representation.

31. The method according to claim 3, wherein the basis semantic element is selected according to a minimization of a total path cost of the semantic representation created according to the selected semantic element.

32. The method according to claim 3, wherein when no path exists between two model elements of the hierarchical object model corresponding to two candidate semantic elements, the path cost between the two model elements is set to infinity for computation of the lowest path cost.

* * * * *